United States Patent
Blank

(10) Patent No.: US 12,130,123 B2
(45) Date of Patent: Oct. 29, 2024

(54) HEADSTAMP MARKING METHOD

(71) Applicant: US Strategic, LLC, St. Louis, MO (US)

(72) Inventor: Michael H. Blank, St. Louis, MO (US)

( * ) Notice: Subject to any disclaimer, the term of this patent is extended or adjusted under 35 U.S.C. 154(b) by 0 days.

(21) Appl. No.: 17/888,231

(22) Filed: Aug. 15, 2022

(65) Prior Publication Data
US 2023/0147350 A1     May 11, 2023

Related U.S. Application Data

(63) Continuation-in-part of application No. 17/152,501, filed on Jan. 19, 2021, now Pat. No. 11,415,398, and a continuation-in-part of application No. 16/689,525, filed on Nov. 20, 2019, now Pat. No. 11,092,415.

(60) Provisional application No. 62/963,062, filed on Jan. 19, 2020.

(51) Int. Cl.
 *F42B 33/14*   (2006.01)
 *B23K 26/362*  (2014.01)

(52) U.S. Cl.
 CPC ............ *F42B 33/14* (2013.01); *B23K 26/362* (2013.01)

(58) Field of Classification Search
 CPC .............. B21K 21/04; B23K 2101/007; B23K 26/362; F42B 5/26; F42B 33/14
 USPC ............... 86/10, 19.6, 19.5, 12, 18; 102/430
 See application file for complete search history.

(56) References Cited

U.S. PATENT DOCUMENTS

| | | | | |
|---|---|---|---|---|
| 6,209,459 B1 * | 4/2001 | Kaufman | ................ | F42B 35/00 102/501 |
| 6,833,911 B2 * | 12/2004 | Lizotte | ............... | B23K 26/0853 356/71 |
| 7,111,423 B2 * | 9/2006 | Lizotte | .................... | F41A 21/12 42/1.01 |
| 2003/0217665 A1 * | 11/2003 | Rennard | ................. | F42B 5/025 102/430 |
| 2004/0027630 A1 * | 2/2004 | Lizotte | ................. | G02B 26/101 359/15 |
| 2006/0174531 A1 * | 8/2006 | Lizotte | .................... | F41A 21/12 42/1.01 |
| 2008/0184873 A1 * | 8/2008 | Martini Filho | ......... | F42B 5/025 86/1.1 |
| 2011/0214583 A1 * | 9/2011 | Dutch | ....................... | F42B 5/26 102/464 |

\* cited by examiner

*Primary Examiner* — John Cooper
(74) *Attorney, Agent, or Firm* — Charles McCloskey

(57) ABSTRACT

A headstamp marking method has the steps of fabricating a plurality of inventory cases, each of them being identical with a round surface, a bare metal head, and a body, and the cases being suitable for different caliber cartridges. The method then has trimming or necking the cases, selecting cases for manufacturing into cartridges, and inscribing, via a laser inscription device, the cases upon their heads. The laser inscription identifies at least the caliber of the cartridge and the number of the cases for manufacturing. The laser inscription device, while removing material of the head along its path, attains insufficient heat and thus avoids compromising the structure of the cartridges and igniting them. The laser inscription device aims and focuses its laser upon a common plane of a head while exhausting its heat through the material ejected from the head.

8 Claims, 10 Drawing Sheets

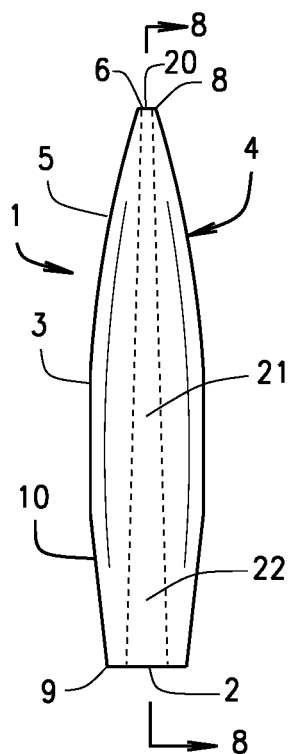
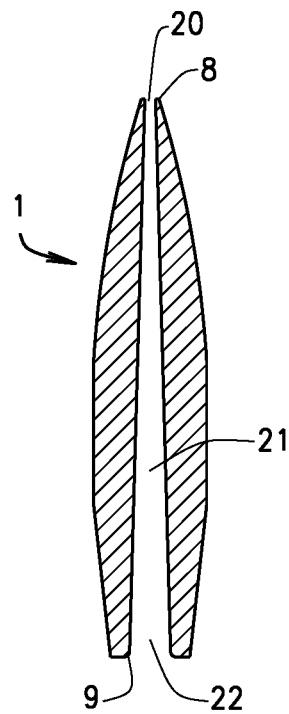
FIG. 5
FIG. 8
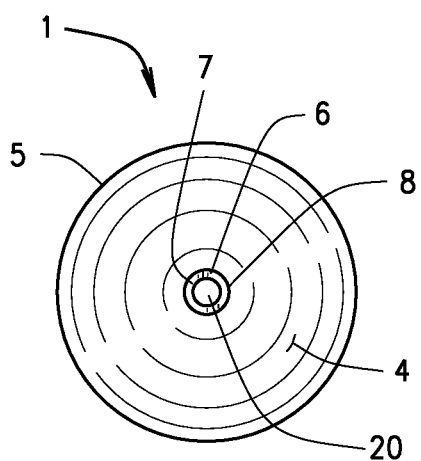
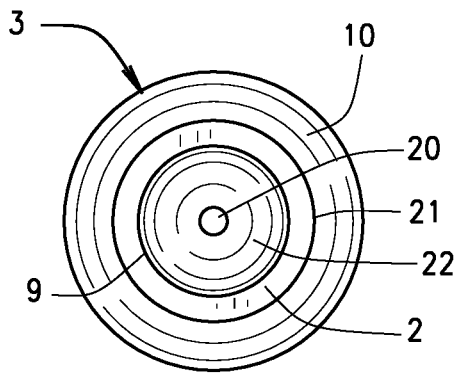
FIG. 6
FIG. 7

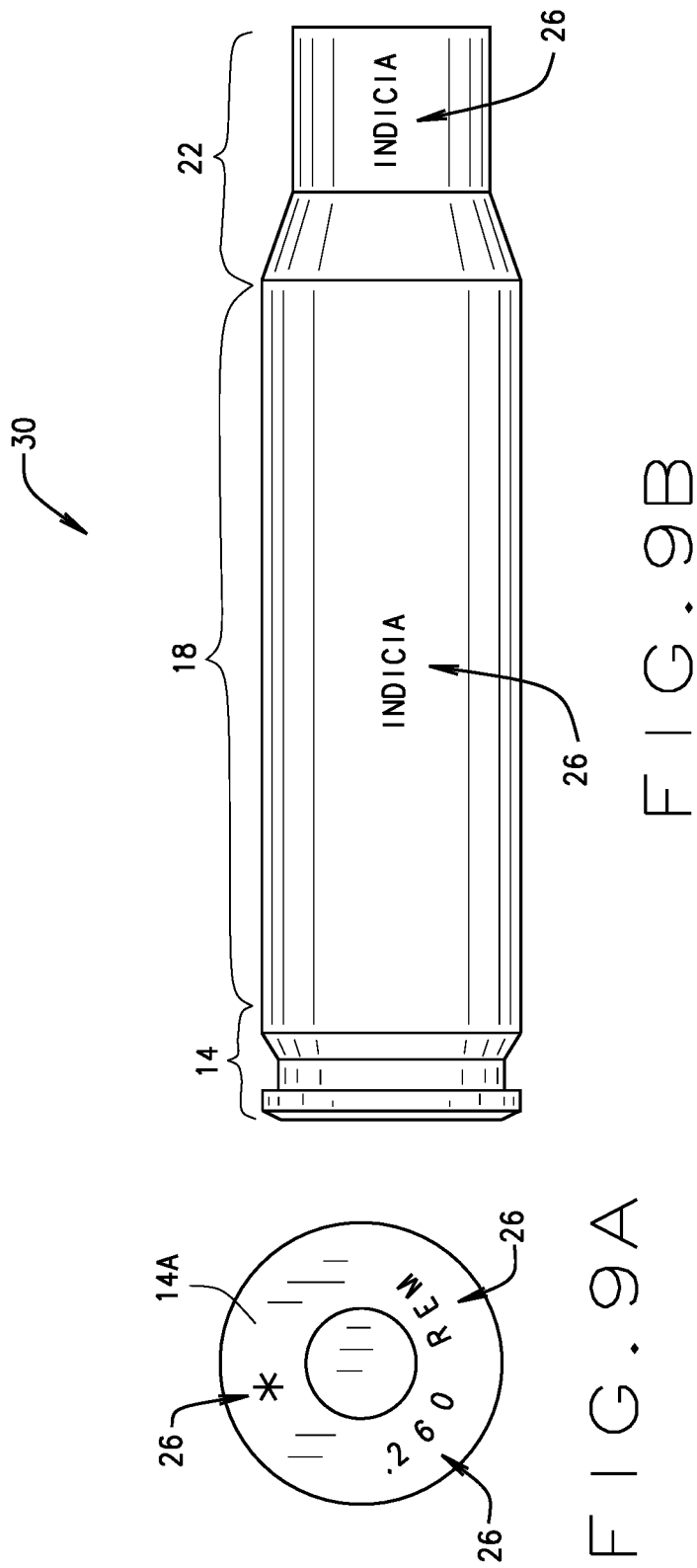

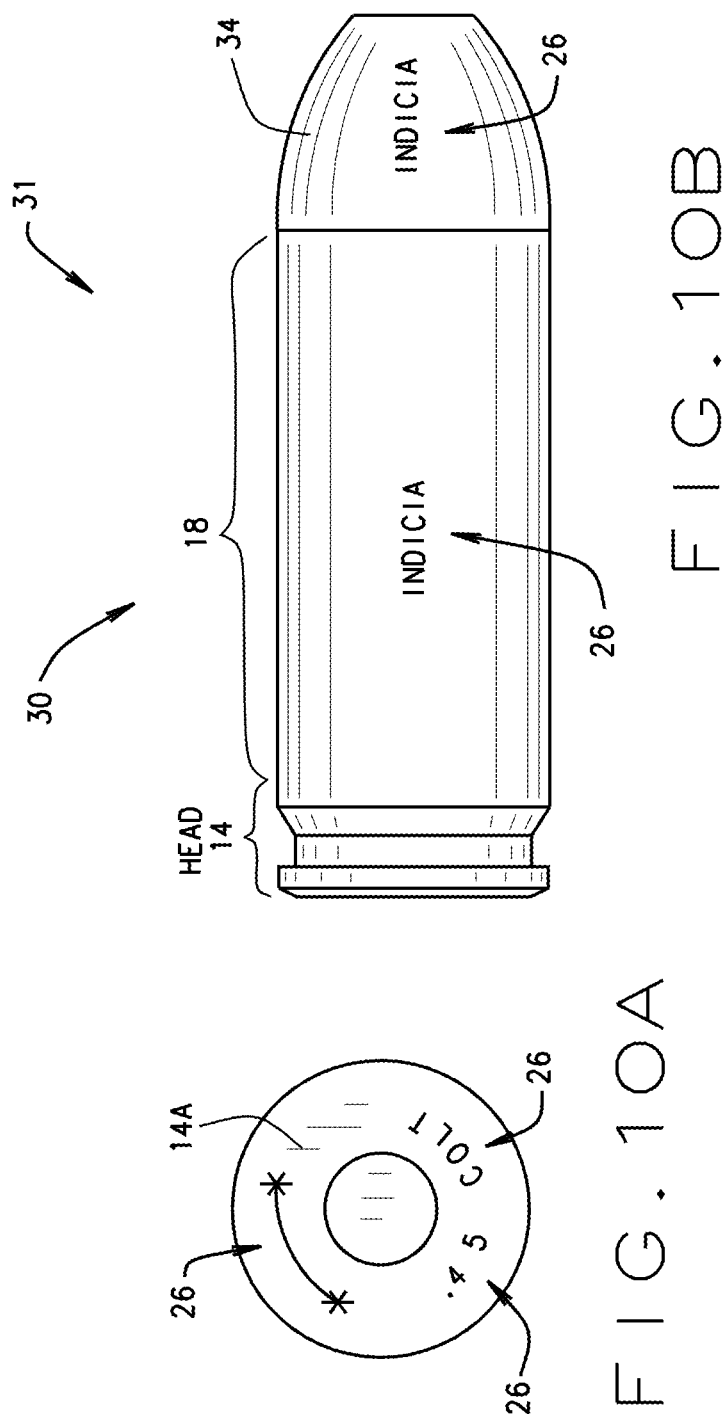

HEADSTAMP MARKING METHOD

CROSS-REFERENCE TO RELATED APPLICATION

This non-provisional application claims priority to the non-provisional application Ser. No. 17/152,501 filed on Jan. 19, 2021 which claimed priority to the provisional application Ser. No. 62/963,062 filed on Jan. 19, 2020 and claims priority to the non-provisional application Ser. No. 16/689,525 filed on Nov. 20, 2019, now U.S. Pat. No. 11,092,415, and all applications have a common inventor.

BACKGROUND OF THE INVENTION

The present invention relates to ammunition such as cartridges, e.g., firearm cartridge, in general and more particularly to a method of manufacturing the head of a cartridge case.

In ancient days, man learned to throw rocks by hand against game or an enemy. Rocks had abundance depending upon geology and man had arms for propelling the rocks. Alas, rocks did fly through the air, but air resistance limited their accuracy. Alas, man threw rocks but in short order, his arms would tire. In time, man being creative sought better ways to reach out and touch something or someone.

Man developed a rock secured to a straight shaft we know as a spear. Man threw the spear, the shaft guided it through the air, and the rock warhead connected with a target on impact. Man though had to carry the spear and numerous spears became heavy on long distances.

Then man realized, a spear could have a smaller size and developed the arrow and archery followed. Man had arrow shafts of various kinds tipped with arrow heads of a multitude of types. Arrowheads are still found of extreme age across the globe showing their prevalence through millennia.

As more centuries passed, man realized the technology of archery had other applications. Man merged archery with early engineering and made catapults. Catapults allowed man to launch heavy or dangerous objects great distances, to reach out and touch something or someone.

A few centuries later, the Chinese developed gunpowder and in time, it reached Western Europe. Before long, man realized gunpowder merged with aspects of archery, spears, and catapults yielded firearms. The first firearms appeared not much before Columbus sailed. The firearms had a marksman load gunpowder manually into a breech then place a wad into the muzzle and pack it towards the breech followed by a ball. The marksman, alone, in a hunting party, or in a military unit, then aimed his musket with the muzzle towards the target and fired it. The ball travelled as best it could, propelled by the gasses from the exploding gunpowder in the muzzle. Ah, the rock thrown by man of old now moves by operation of exploding gasses.

Thus, over the last three centuries, firearms underwent a continuous evolution spurred by armed conflict from time to time, hunting regularly, and machine developments. Muzzle loaders became muskets. Muskets in time became rifles. Mortars became cannons. Cannons became artillery. All of these whether small or large moved a projectile at high velocities and improving accuracy. At higher velocities, projectiles endured aerodynamic forces during their flights to targets. Developments in machinery design allowed weapons to partially, or fully, mechanize insertion of projectiles into a breech, firing of the projectile, ejectment of spent material, and loading of the next projectile. As hunting made man a better marksman, armed combat made man's weapons and rifles more accurate. Nowadays, projectiles semi-automatic or automatic loading as they have the form of cartridges. Some weapons have become fully automatic and appear as machine guns. Yet each development in rifles and weapons still sought to move a projectile to reach out and touch something or someone at increasing distances. The ancient task of man remains.

As is known in the industry, cartridge manufacturers (e.g., firearm cartridge manufacturers) mass produce cartridge cases whereby, prior to completion of a heading step in the manufacturing process, the cases are suitable for use in the production of a plurality of cartridges (e.g., different caliber cartridges). However, for over a century, due to the requirement to mark the cases with the name of the cartridge case, which most often includes the caliber of projectile with which the case will be loaded and the name of the cartridge, as well as the name of the actual physical manufacturer making the cartridge case, known methods for manufacturing cartridge cases have forced manufacturers to mark the cases at this early stage in the manufacturing process. Particularly, all known manufacturing methods mark the cases during the heading process. The known method of marking the cases is by stamping an imprint into the base, or bottom, of the head of the case. Such stamping of the case must be done during the heading process due the material property changes that the heading process causes that cannot occur during the remaining steps in manufacturing the cases that are subsequent to the heading process. For example, the heading process permanently hardens the head forming the required grain structure. This keeps the cartridge case too hard to imprint in subsequent stages. Any annealing to permit the imprinting would destroy the structural integrity of the case, so after heading this part of the case is isolated from any exposure to any heat source in all known methods for manufacturing.

Hence, in order to have a ready supply of various cartridge cases, wherein each case be utilized to manufacture a plurality of different caliber cartridges, due to the production speeds and economic cost of stopping the line to change the bunter used in heading to imprint cartridge, manufacturers typically must produce (and often store) a significant amount (e.g., hundreds of thousands) of cases stamped and designated for each respective one of a plurality of different calibers. This leads to the manufacturing of headstamped cartridge cases for the vast plurality of different cartridge cases. Moreover, as manufacturing quantities are generally in the hundreds of thousands, at a minimum, with most manufacturers having production minimums in the millions for any cartridge case to be manufactured, this can lead to large material waste and financial losses when the demand for any particular caliber case is less than the supply of the manufactured and stored cases of the particular caliber.

Beyond the material waste this creates a significant barrier of entry with a cooling effect on innovation and invention. More concerning, many inventors, due to these economic constraints of the known manufacturing process, use cartridge cases that they have reformed to their own design, but that still have their original headstamp. This creates a potential public danger as these cases are not properly marked for what they have become and can cause, and have caused, catastrophic, even fatal, accidents due to mistaken identity. Further, to date, it has never been possible, with current or earlier manufacturing methods, to mark the side of the body, the shoulder, the neck, or the projectile of a cartridge case.

DESCRIPTION OF THE PRIOR ART

Projectiles take many forms from large high explosive bombs, through missiles and rockets, to bullets of all kinds. Early bullets had the form of round lead balls made by soldiers in the fields of Europe, North America, and beyond. In the last century, bullets took on common forms as manufacturing standardized them. Many times, ammunition manufacturers made both hunting cartridges and military cartridges. Each cartridge has a bullet place into one end of it upon the gunpowder and crimped. The bullet has its working end exposed for insertion into a breech and ultimate travel down a rifled barrel.

Present day bullets have a generally pointed tip upon a cylindrical body with sufficient weight, in grains, to survive detonation of the gunpowder, called primer, in the cartridge, of contact with gasses in the barrel, of flight through air, and of contact with a target or other item. Each phase of a bullet's life calls for precise shaping to meet the competing performance characteristics.

For example, Sierra Bullets, LLC of Sedalia, MO has a 308 bullet. This bullet has a pointed tip that widens in a conical section to a cylinder. The cylinder then tapers as a frustum, and the frustum truncates to a flat surface opposite the tip. The cylinder, frustum, or both also acquired the moniker boattail from aerodynamic effects observed in wind tunnel testing. Each portion of the bullet has its role to perform. And yet, this bullet still does not fully meet the demands of military, law enforcement, and hunters for accuracy.

Though preceding description has referred to bullets, the description also applies to artillery shells and other ordnance. While the above-described devices fulfill their respective, particular objectives and requirements, the aforementioned devices do not describe a gas favoring boattail projectile. Therefore, a need exists for new and improved gas favoring boattail projectile that can be used for improved release from a muzzle, flight performance, and shot grouping on a target. In this regard, the present invention substantially fulfills this need. In this respect, the gas favoring boattail projectile according to the present invention substantially departs from the conventional concepts and designs of the prior art, and in doing so provides a device primarily developed for the purpose of optimizing positive effects from the ogive and boattail of a projectile, primarily a bullet.

Also, in this specification where a feminine pronoun is used, the masculine pronoun is implied.

The gas favoring boattail projectile overcomes the above-mentioned disadvantages and drawbacks of the prior art. As such, the general purpose of the present invention, which will be described subsequently in greater detail, is to provide a new and improved gas favoring boattail projectile which has all the advantages of gas favoring boattail projectile which are not anticipated, rendered obvious, suggested, or even implied by the prior art, either alone or in any combination thereof.

SUMMARY OF THE INVENTION

The headstamp marking method has the steps of fabricating a plurality of inventory cases, each of the being identical with a round surface, a bare metal head, and a body, and the cases being suitable for different caliber cartridges. The method then has at least one of trimming or necking the cases, selecting cases for manufacturing into cartridges, and inscribing, via a laser inscription device, the cases upon their heads. The laser inscription identifies at least the caliber of the cartridge and the number of the cases for manufacturing. The laser inscription device, while removing material of the head along a path of the laser inscription device, attains insufficient heat and thus avoids compromising the structure of the cartridges and igniting them. The inscribing, via the laser inscription device, aims and focuses the laser upon on a common plane of the head of each case following at least one axis while exhausting its heat through the case material ejected from the head. The method retains the hardness of the head as part of a case or cartridge.

There has thus been outlined, rather broadly, the more important features of the invention in order that the detailed description thereof that follows may be better understood and in order that the present contribution to the art may be better appreciated.

The headstamp marking method also yields a gas favoring boattail projectile among other forms. This projectile has a body, a nose extending from the body as an ogive, a tip upon the nose, a meplat of the tip, a frustum outwardly of the body and opposite the nose, and a base opposite the tip. The frustum also appears as a boattail and the body appears as a cylinder. The projectile has a caliber denoting its widest diameter. The meplat has a proportional relationship to the boattail and the boattail has an angular relationship to the surface of the cylinder. The relationships of specific features of the invention optimize its accuracy on target while remaining within weight and other specified parameters.

This headstamp marking method has ability to inscribe bare metal, retention of grain structure of the metal, maintaining hardness after application of the method, and a head so marked by the method allows a cartridge to retain it structure following ignition during usage. The present invention recognizes hardness measured on the Vickers and the Brinell scales. An alternate embodiment of the invention has a longitudinal conical aperture extending the length of the projectile. Additional features of the invention will be described hereinafter, and which will form the subject matter of the claims attached.

In various embodiment, the present disclosure provides a method of manufacturing cartridge cases, wherein the method comprises fabricating a plurality of substantially identically sized and shaped unmarked inventory cases suitable for use in manufacturing a plurality of different caliber cartridges and selecting a number of the plurality of the unmarked inventory cases to be used to manufacturing a selected one of the plurality different caliber cartridges. The method further comprises inscribing, via a laser inscription device, the selected number of unmarked inventory cases to identify at least the selected one of the plurality of different caliber cartridges the selected number of unmarked inventory cases are to be used to manufacture.

In various other embodiments, the above present disclosed method adds the steps of priming the selected number of inscribed cases, loading an amount of propellant desired for the selected one of the plurality of different caliber cartridges into the selecting number of inscribed cases, and loading a projectile desired for the selected one of the plurality of different caliber cartridges into the selected number of inscribed cases.

In yet other various embodiments, the present disclosure provides a cartridge case, wherein the case comprises a head, a body, and a laser inscription on at least one of the head and the body identifying at least a caliber of the cartridge of which the case is a component thereof or the case is to be used to manufacture.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved headstamp marking method that may be easily and efficiently manufactured and marketed to the consuming public and supply sources.

Still another object of the present invention is to provide a headstamp marking method that records information upon the head of a case.

Still another object of the present invention is to provide a headstamp marking method that ejects heated material of a case transferring incident heat away from the case.

Still another object of the present invention is to provide a headstamp marking method that avoids igniting a cartridge having a case.

Still another object of the present invention is to provide a headstamp marking method that retains the hardness of a case after usage of the method thereon.

Still another object of the present invention is to provide a headstamp marking method that retains the structure and grain structure of a case.

Still another object of the present invention is to provide a headstamp marking method that inscribes the bare metal of a case.

Moreover, the present invention clearly describes the case in easily read writing, more easily read by those with visual impairments such as darkness, inclement weather, and mud. Marking of head of the cartridge by the present invention utilizes universal non-language based symbols, indicating for example, that dangerous materials, such as uranium, are present.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings,

FIG. 5 is a side view of an alternate embodiment of the invention;

FIG. 6 is a front view of an alternate embodiment of the invention;

FIG. 7 is a rear view of an alternate embodiment of the invention;

FIG. 8 is a section view of an alternate embodiment of the invention;

FIG. 9A is a rear view of a head of a cartridge case having a laser etched marking, in accordance with various embodiments of the invention;

FIG. 9B is a side view of the cartridge case shown in FIG. 9A, having additional indicia laser etched into a body of the cartridge, in accordance with various embodiments of the invention;

FIG. 10A is a rear view of a head of a loaded cartridge having a laser etched marking, in accordance with various embodiments of the invention;

FIG. 10B is a side view of the cartridge shown in FIG. 10A, having additional indicia laser etched into a body or a projectile of the cartridge, in accordance with various embodiments of the invention;

The same reference numerals refer to the same parts throughout the various figures.

DESCRIPTION OF THE PREFERRED EMBODIMENT

Figure 1:
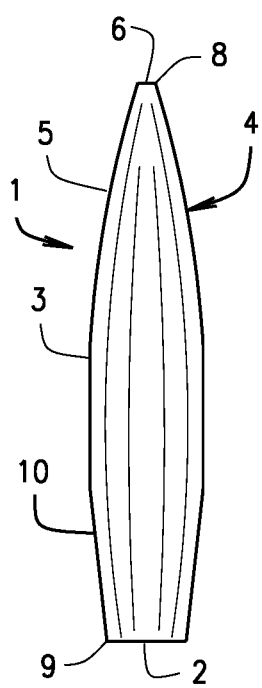
FIG. 1 is a side view of an alternate embodiment of the invention.

Referring now to the drawings, and particularly to FIGS. 1-19, an alternate embodiment of the gas favoring boattail projectile related to the present invention is shown by the reference numeral 1.

FIG. 1 shows a projectile 1 in a side view. Because this projectile is round, it is also symmetric from side to side. Thus FIG. 1 takes the place of other figures. Here, the projectile appears as a bullet though other forms are possible. The projectile has a generally elongated cylindrical form with a flat base 2 forming a plane perpendicular to the length of the invention. The projectile widens upwardly from the base through a frustum, also called a boattail 10, and has a frustoconical form, or shape. The base 2 joins to the boattail 10 of the frustum upon an aft edge 9. In this alternate embodiment, the aft edge 9 appears as a rim defined by the intersection of the plane of the base 2 to the frustoconical boattail 10. In an alternate embodiment, the aft edge 9 has a rounded rim decreasing formation of vortices and turbulent air flow rearward of the projectile.

The boattail widens and merges with the body 3, or cylinder, that also establishes the maximum diameter of the projectile, or its caliber. The body extends away from the boattail opposite the base. The body then merges into an ogive as at 4. The ogive has its form as a curve upon a radius greater than the length of the projectile and that curve is rotated about the alternate of the projectile. The ogive also provides a nose 5 of the projectile the decreases in its diameter as it departs the body. The decrease in diameter follows the curve established for the ogive and decreases more noticeably the further it gets away from the body. The nose narrows to its tip 6, opposite the base. The tip and the base define mutually parallel and spaced apart planes. The tip has a lesser diameter than that of the base and the caliber of the projectile. The tip also has a meplat form as later described. The tip 6 joins to the nose 5 of the ogive 4 upon a fore edge 8. In the preferred embodiment, the fore edge 8 appears as a rim defined by the intersection of the plane of the tip to the nose. In an alternate embodiment, the fore edge 8 has a rounded rim promoting initiation of laminar air flow at the nose and rearward along the projectile.

Upon experimentation and testing, the Applicant has found that while the ogive operates best with certain designs and projectile configurations, the key part of the invention relates to the area of the meplat. During testing, the Applicant endured breakage of equipment when making cartridges. In an alternate embodiment, the Applicant found semi-circular or, half moon, cuts of material out of the ogive kept close the accuracy of other projectiles. The Applicant Identified that some previously pulled projectiles with partial deformation of their bases also had incredible inaccuracy. The Applicant's testing has yielded that almost without exception the inaccuracy of the projectile traces to damage upon the rear of the projectile. The Applicant strongly opines of this invention's significances for ordnance development, deserving of more attention from industry and its customers.

Figure 2:
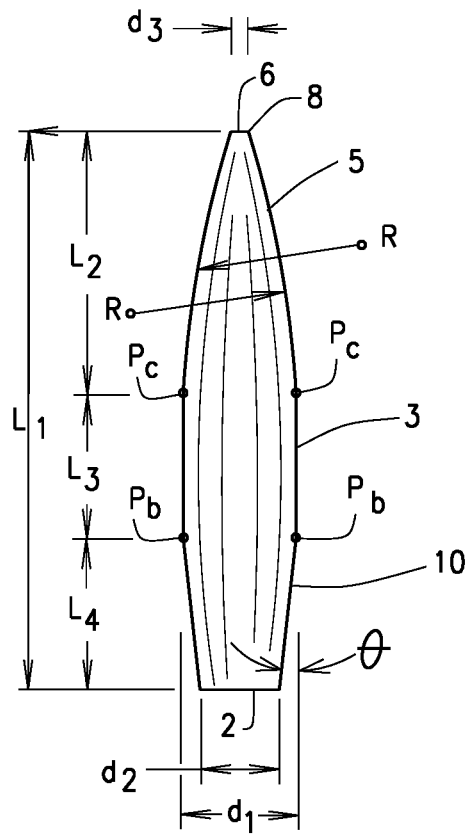
FIG. 2 is another side view of an alternate embodiment of the invention denoting dimensional characteristics.

Turning to the key aspects of the invention, FIG. 2 shows a side view of the alternate embodiment of the invention marked for dimensions, key points, and at least one angle. The alternate embodiment of the invention has its maximum width, that is, maximum diameter, as at $d_1$, shown towards the bottom of the figure, typically towards the head of boattail 10. This maximum $d_1$ is the caliber of the projectile, alternatively $d_1$ is the first diameter. Inwardly from the maximum diameter, the boattail begins at its narrowest diameter as at $d_2$, also at the base 2, alternatively $d_2$ is the second diameter. Opposite the boattail and the base, the projectile has its narrowest diameter as at $d_3$ for the tip 6, alternatively $d_3$ is the third diameter. From the base to the tip, the projectile has its total length as at $L_1$, generally defined as a multiple of the caliber of the projectile, see Eq. 1. The total length has three components: second length as at $L_2$ from the nose, third length as at $L_3$ of the body, and the fourth length as at $L_4$ of the boattail. The length, second length, third length, and the fourth length extend generally parallel to the centerline of the projectile.

More particularly, the second length, $l_2$, is for the axial length of the nose from the tip 6 to where the ogive 4 ends, as at the fore edge 8. Here shown in a side view, the nose begins with the tip 6 and its truncated form, widens to the fore edge 8, and then follows the curve outwardly of the nose to the body 3. Where the curve of the nose approaches tangency to the body, the body commences as at $P_c$, the point of curvature. The third length, $L_3$, then shows the axial length of the body from the nose to the boattail. The third length extends from the point of curvature to a point of beginning as at $P_b$. The boattail then commences from the point of beginning. The point of curvature $P_c$ and the point of beginning $P_b$ appear shown in pairs to the left and to the right of the figure. These pairs have mutual spacing of the caliber of the projectile. The point of curvature $P_c$ and the point of beginning $P_b$ also have a spacing along the centerline of the projectile denoting the length of the body. The fourth length shows the distance along the centerline of the projectile over which the boattail tapers from the points of beginning $P_b$ to the base 2.

Moving from lengths, the boattail 10 has its truncated tapered shape from the base 2 with its narrowest diameter $d_2$ to the points of beginning $P_b$ spaced apart at the maximum diameter $d_1$ or caliber of the projectile. The difference between the maximum diameter $d_1$ and the narrowest diameter $d_2$ along the fourth length $L_4$ constitutes the boattail angle as at $\theta$. The boattail angle, $\theta$, tapers the boattail for fit into a cartridge, see Eq. 2, and later for passage of propellant gasses as the projectile exits a muzzle and through the atmosphere as the projectile travels to its target. Generally, opposite the boattail, the nose 5 may have its shape of an ogive 4. The ogive is a rotated conic section from a curve commencing at the points of curvature $P_c$ along a radius r on a center outwardly of the ogive. The curve terminates at the edge of the tip 6 as at the third diameter $d_3$.

$$\text{Thus where } \theta=7°, \text{ then } l_4 \approx 1.2 * d_1 \qquad \text{Eq. 1}$$

$$3 < l_1 < 6 \qquad \text{Eq. 2}$$

Figure 3:
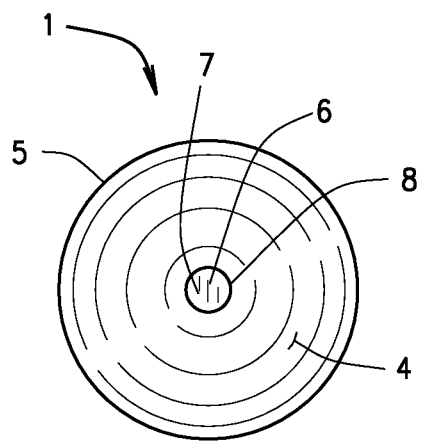
FIG. 3 is a front view of the alternate embodiment of the invention.

FIG. 3 has the projectile of the alternate embodiment of the invention shown in a front view as in the portion of the projectile that impacts a target first. The projectile has its nose 5 generally rounded in the ogive 4 from the widest portion, as at the first diameter $d_1$ or maximum, to the narrow portion, as at the tip 6. The widest portion is into the plane of this figure. The tip has the third diameter $d_3$ that defines the width of a meplat 7 which is a generally flat surface perpendicular to the length of the projectile. The meplat 7 extends inwardly from the fore edge 8 upon the tip 6. The tip and meplat also have form in coordination with the nose. The tip and meplat are out of the plane of this figure.

$$d_3 = \frac{n}{N} d_2,$$

where $0<n<0.33$ and $0<N<1.5$      Eq. 3

$d_3=cd_2$, where $0.14<c<0.25$      Eq. 4

The projectile has a critical part in the area of the meplat 7, that is, the flat area at the front of the projectile, such as a bullet, shown in FIG. 3 as at 7. More particularly in this alternate embodiment, the meplat has its diameter, or third diameter $d_3$, at the beginning of the projectile, between 0.010 and 0.015 times the diameter of the caliber. Opposite the meplat, the base 2 has its diameter $d_2$, the second diameter, as about as 0.70 times the caliber of the projectile, or $d_1$. Moreover, the base 2 has the diameter of the projectile's caliber reduced by about 0.15 times the diameter of the projectile per side, that is, about 0.30 divided by two, see Eq. 3, 4. Keeping in mind the boattail, the projectile of the invention has about a seven-degree boattail angle, $\theta$, that yields a boattail length $L_4$, or fourth length, of approximately 1.2 times the diameter of the caliber, see Eq. 1. This fourth length well exceeds lengths seen in industry at present. In an alternate embodiment, the tip 6, may have the form of a small hollow point as later shown in FIGS. 5-8.

Figure 4:
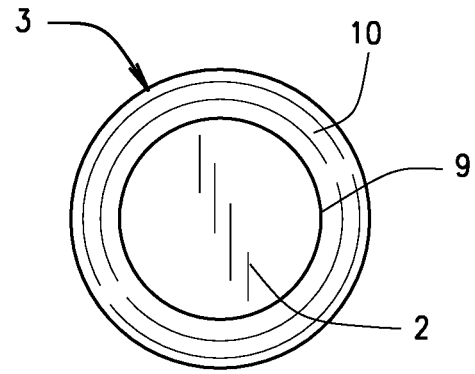
FIG. 4 is a rear view of the alternate embodiment of the invention.
Figure 11A:
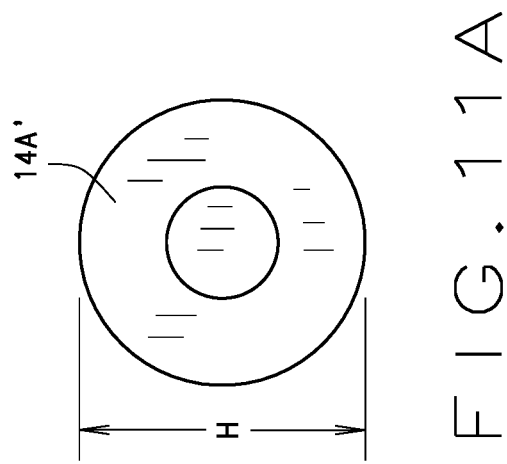
FIG. 11A is a rear view of a head of an unmarked multicaliber inventory case, in accordance with various embodiments of the invention.
Figure 11B:
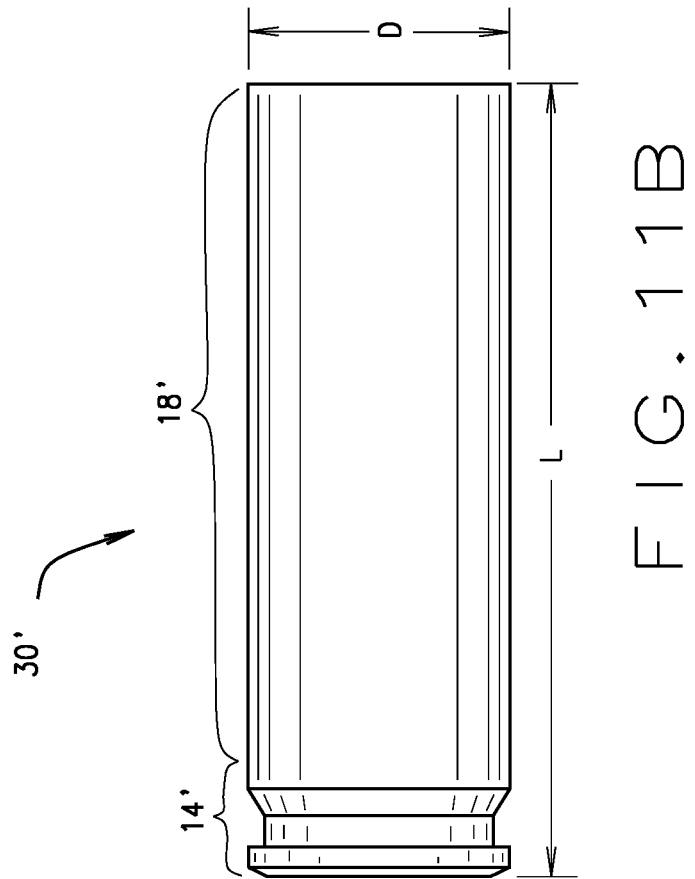
FIG. 11B is a side view of the unmarked multicaliber inventory case shown in FIG. 11A, in accordance with various embodiments of the invention.

Turning the projectile once more, FIG. 4 shows a rear view of the projectile as seen before insertion into a cartridge, not shown, during manufacturing. The projectile has its body 3, generally round, of maximum diameter, as at $d_1$, and into the plane of this figure. The boattail 10 proceeds inwardly along the boattail angle, $\theta$, to the aft edge 9 and then inwardly as the base 2. The base is centered upon the boattail and upon the projectile. The base extends out of the plane of this figure and has it narrow, or second, diameter $d_2$.

Returning to the boattail angle, $\theta$, and its fourth length, both cooperate to define the form of the boattail 10. The boattail angle, $\theta$, falls within a range of about 7 to about 10 degrees but the boattail leads to a much narrower base 2 than presently seen with its greater fourth length, that is, a longer tail. A boattail angle of 8.5 degrees stays proximate the caliber of the projectile which provides decent protection. In the prior art, a projectile has a rebated boattail that has a shoulder incised inwardly from the base, akin to a step, and the boattail commences at the shoulder. The present invention though has a proportional lengthening at the base, measured from the base and thus narrower than the prior art. Thus, the present invention utilizes a boattail angle, $\theta$, of about 7 to about 10 degrees. At the high end of that range, the invention still has a fourth length about 0.85 times caliber that exceeds prior art boattail lengths.

The boattail dimensions coo rate in this relationship:

$$\theta = \arctan \frac{d_1 - d_2}{Nd_1},$$

where $0<N<1.5$      Eq. 5

Turning to other ratios, the first length $L_1$ is:

$L_1=d_1*N$, where $N$ is an integer above 3.      Eq. 6

The boattail 10 has these equations driving its dimensions:

$L_2(cal)=d_1*L_2;$      Eq. 7

Per caliber and per side length given as $L_3$;

angular base width reduction=$d_1-2*(d_3*L_2*L_3);$      Eq. 8 meplat width as $d_2*N, 0<N<0.95;$      Eq. 9 nose length $L_2$ as $d_1*N$, where $N$ is an integer above 2; and,      Eq. 10

The ogive 4 follows the secant 3/4 power law and has a ratio of $R_t/R$ of 0.5.

Let us turn to two examples. The first example is for a projectile having a first length, $L_1$, of four times caliber. The first length divides into the nose 5 having its second length, $L_2$, of two times caliber, the boattail having its fourth length, $L_4$, of 1.2217 caliber related from the boattail angle $\theta$, and its body 3 having its third length $L_3$ as follows:

$L_3=L_1-(N*d_1)-L_2$, where $N$ is an integer above 3.      Eq. 11

For the second example, a projectile has a first length, $L_1$ of five times caliber. The nose 5 then has its second length 2 of two calibers, the boattail still has its fourth length, $L_4$ of 1.2217 caliber, and the body 3 following Eq. 11 has its third length $L_3$ as 0.7783 the same as the first example above.

FIG. 5 provides an alternate embodiment of a projectile 1 in a side view. Because this projectile is round, it is also symmetric from side to side. Thus FIG. 5 takes the place of other figures. Here, the projectile appears as a bullet though other forms are possible. As before, the projectile has a generally elongated cylindrical form with its flat base 2 from which it widens upwardly through a frustum, also called a boattail 10. The base 2 joins to the boattail 10 of the frustum upon the aft edge 9. The aft edge 9 appears as a rim defined by the intersection of the plane of the base 2 to the boattail 10 or alternately as a rounded rim.

The boattail widens and merges with the body 3 that sets the maximum diameter, or caliber, of the projectile. The body extends away from the boattail opposite the base. The body then merges into the ogive 4 with its form as a curve upon a radius greater than the length of the projectile and that curve being rotated about the centerline of the projectile. The ogive also has the nose 5 where the projectile decreases its diameter as it departs the body. The decrease in diameter follows the curve established for the ogive and decreases more noticeably the further it gets away from the body. The nose narrows to its tip 6, opposite the base. The tip and the base define mutually parallel and spaced apart planes. The tip has a lesser diameter than that of the base and the caliber of the projectile. The tip also has the meplat 7. The tip 6 joins to the nose 5 of the ogive 4 upon a fore edge 8. As before, the fore edge 8 appears as a rim defined by the intersection of the plane of the tip to the nose. The fore edge 8 has a rounded rim promoting initiation of laminar air flow at the nose and rearward along the projectile.

This alternate embodiment has an aperture 21, here shown in phantom, extending through its length. The aperture has its fore opening 20 within the tip 6 and an opposite aft opening 22 within the base 2. The fore opening generally has a round shape and a diameter while the aft opening has its round shape a diameter exceeding that of the fore opening. The aperture as it extends from the fore opening to the aft opening attains a tapered form widening opposite the direction of flight of the projectile. The tapered form of the aperture, particularly the aft opening leads to release and dissipation of any vacuum trailing the projectile thus reducing its drag. As later shown, the fore opening 20 and the aft opening 22 have a chamfer of approximately 0.5 r.

As to reducing vacuum, the alternate embodiment of the invention has a calculably high ballistic coefficient. Utilizing typical, standard calculators, the invention has a ballistic coefficient at least 20% higher than the prior art because the boattail has more length than the prior art which leads to a smaller base creating less drag. The alternate embodiment with its aperture allowing air to pass into the vacuum behind the projectile would lessen the drag. This further drag reduction appears as observed evidence from tests and anecdotal evidence from tracer rounds that release a gas into the trailing vacuum. The tracer rounds unintentionally, and alas detrimentally, make their ballistic coefficient higher thus the tracer rounds really do not follow compatible flight tracks with the non-tracer projectiles. At the range, the Applicant has observed this where an observer sees tracer rounds flying over a berm and going on either side of targets, but does not see the targets falling. Meanwhile, experience and ballistics of non-tracer rounds suggest 5 to 10 projectiles should have impacted the targets, as 5 to 10 non-tracer rounds fly between consecutive tracer rounds. This failure to hit the targets occurs because the higher drag of the tracers has pulled their trajectory down and the tracer and non-tracer rounds impact the bottom of the berm and not the targets.

FIG. 6 then shows the alternate embodiment of the projectile of the invention shown in a front view with the fore opening 20 centered in the meplat 7 of the tip 6. As before, the projectile has its nose 5 generally rounded in the ogive 4 from the widest portion, as at the first diameter $d_1$ or maximum, to the narrow portion, as at the tip 6. The aperture 21 extends into the plane of this figure inwardly from the fore opening. The tip's widest portion is into the plane of this figure, and it has the third diameter $d_3$ that defines the width of the meplat 7. The meplat follows Eq. 3, 4 as previously discussed. The projectile has a critical part in the area of the meplat 7, that is, the flat area at the front of the projectile, such as a bullet here shown. The tip 6, more precisely the meplat 7, in this alternate embodiment has the form of a small hollow point.

Turning the projectile once more, FIG. 7 shows a rear view of the projectile as seen before insertion into a cartridge, not shown, during manufacturing. The projectile has its body 3, generally round, of maximum diameter, as at $d_1$, and into the plane of this figure. The boattail 10 proceeds inwardly along the boattail angle, θ, to the aft edge 9 and then inwardly as the base 2. The base is centered upon the boattail and upon the projectile. The base extends out of the plane of this figure and has it narrow, or second, diameter $d_2$. The base has the aft opening 22 centered upon it and leading into the aperture 21. The aft opening exceeds one quarter of the diameter of the base. From the aft opening to the fore opening, the aperture extends continuously. As before, the aft opening has a greater diameter than the fore opening, here shown well into the plane of the figure.

And FIG. 8 has a section view lengthwise through the alternate embodiment of the projectile. The projectile 1 has its lengthwise aperture 21 here shown in tapered form from the aft opening 22 to the fore opening 20. The two openings 20, 22 have rounded rims with a chamfer of approximately 0.5 r.

Referring now to FIGS. 9A, 9B, 10A, 10B, 11A, 11B, in various embodiments, the present disclosure provides a cartridge case 30 (e.g., a firearm cartridge case) having information and other indicia laser etched, cut, burned or otherwise laser inscribed, or laser marked thereon. The information and other indicia are inscribed on the case using a laser etching, cutting, or burning device, or other laser inscription or engraving device, machine, or printer. The case 30 can be fabricated from a metal such as steel, brass, copper, aluminum, zinc, titanium, or alloys thereof. More specifically, in various embodiments the case 30 is fabricated by working (e.g., machine pressing, stamping, and drawing) a metal coin (e.g., a piece of metal having a desired weight and mass, and shaped to resemble a coin) to form the case 30 having a desired diameter, length and shape. In various instances, the case 30 can be fabricated (e.g., molded) of a plastic or other composite material.

The case 30 generally comprises a head section 14, referred to herein as the head 14, and a body section 18 extending from the head 14, referred to herein as the body 18. In various instances, as exemplarily illustrated in FIG. 10B, the case 30 can additionally comprise a neck section 22 extending from the body 18, referred to herein as the neck 22. The case 30 comprises one or more laser inscription 26 inscribed or otherwise durably inscribed or marked on the head 14 and the body 18 and the neck 22 utilizing a laser a laser etching, cutting, or burning device, or other laser inscription or engraving device, machine, or printer. As used herein the term "durably inscribed" will be understood to mean that the laser inscriptions 26 are laser etched, cut, or burned into the case 30 such that the laser inscriptions 26 will meet the cartridge case marking requirements of a durable mark as set by the Sporting Arms & Ammunition Manufactures Institute (SAAMI) standardization board.

The laser inscriptions 26 can comprise any desired information or indicia. For example, in various embodiments, the laser inscriptions 26 can comprise the name of the cartridge which usually includes the name and caliber of the cartridge the case 30 is intended to be used to manufacture (e.g., the caliber of the cartridge for which the case is intended to be a component thereof), or any other desired indicia or information such as: the name of the manufacturer of the case 30, or the name of the company or individual who contracted to have the case made; a trademark; dated of manufacture; a serial number; a tracking code; a bar code; a QR code; any desired design, image or picture; any desired text such as a slogan, verse or saying; and/or any other desired data. As indicated in FIGS. 9A, 9B, 10A, 10B, the laser inscriptions 26 can be inscribed on any portion or part of the case 30. For example, case 30 can comprise the name, caliber and case manufacturer laser inscribed on a bottom 14A of the head 14. Alternatively, or additionally, the name, caliber and manufacture can be laser inscribed on the body 18 and on the neck 22. Furthermore, for example, the case 30 can comprise any other indicia laser inscribed on the head bottom 14A and on the body 18 and on the neck 22.

Referring now to FIGS. 9A, 9B, 10A, 10B, 11A, 11B, as described below, in various embodiments, the case 30 can be fabricated or manufactured to initially be an unmarked inventory case 30' that is suitable for use in fabricating or manufacturing a plurality of different caliber cartridges (e.g., an unmarked multicaliber inventory case). Therefore, the unmarked multicaliber inventory case 30' can be fabricated or manufactured absent any intentional markings, and held or stored in inventory as such until it is determined which of the plurality of possible caliber cartridges the unmarked multicaliber inventory case 30' is to be used to manufacture. Then, thereafter the unmarked multicaliber inventory case 10' can have the laser inscriptions 26, e.g., the name, caliber and case manufacture, laser etched, cut, burned or otherwise laser inscribed, or laser marked on the head bottom 14A' and body 18' and neck 22'. Furthermore, in various embodiments, the unmarked multicaliber inventory case 30' can be one of a plurality, e.g., hundreds of thousands or millions, of unmarked multicaliber inventory cases 30' that are absent any intentional markings and stored as inventory until any number of the unmarked multicaliber inventory cases 30' are designated for use in manufacturing a plurality of particular caliber cartridges. Whereafter, the plurality of unmarked multicaliber inventory cases 10' can have the laser inscriptions 26, e.g., the name, caliber and case manufacturer, laser etched, cut, burned or otherwise laser inscribed, or laser marked on the head bottoms 14A' and bodies 18' and necks 22'.

Referring now to FIGS. 10A, 10B, in various embodiments, the case 30 can be a component of cartridge 31, e.g., a firearm cartridge. In such embodiments, the cartridge 31 comprises the case 30 or, in various instances unmarked multicaliber inventory cases 10', primed, i.e., has a primer installed, and loaded with propellant, e.g., filled with a measured amount of smokeless propellant or black powder, and a projectile 34, such as a bullet shown, pressed into the case 30/30'. In such embodiments, the projectile 34 can also include one or more laser inscriptions 26 that is laser etched, cut, burned or otherwise laser inscribed, or laser marked on any portion of the projectile 34. In such instances, the laser inscriptions 26 can be laser etched, cut, burned or otherwise laser inscribed, or laser marked on the projectile 34 before or after the projectile 34 is pressed into the case 30.

Figure 12:
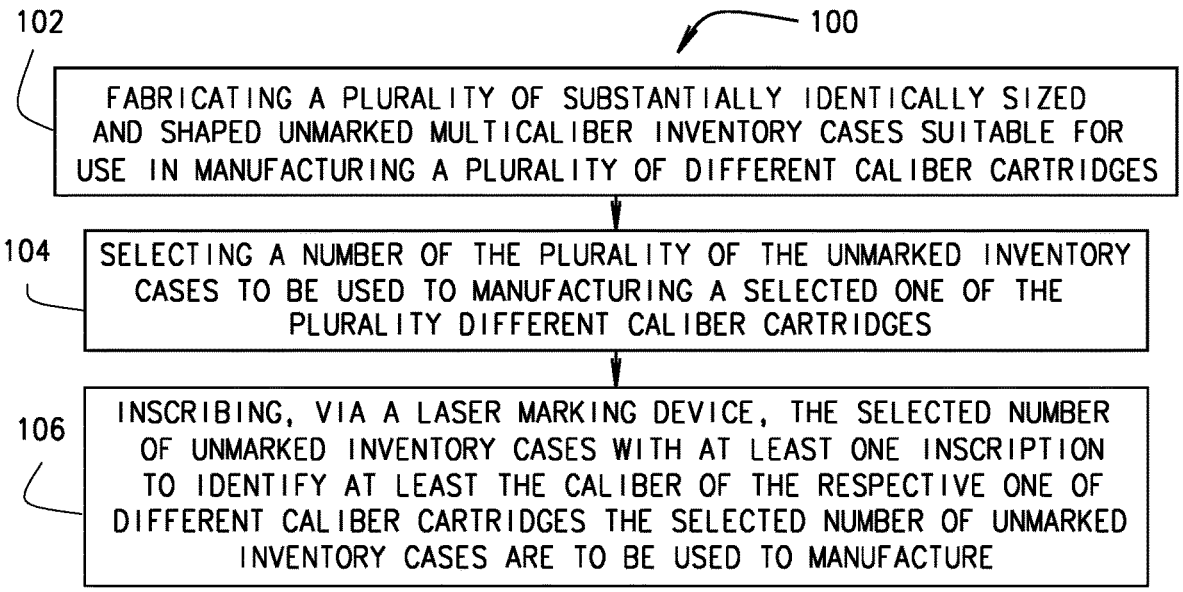
FIG. 12 is a flow chart illustrating a method of manufacturing a cartridge case, in accordance with various embodiments of the invention.

Referring now to FIGS. 9A, 9B, 10A, 10B, 11A, 11B and 12, as described above, in various embodiments, this specification provides a method for manufacturing one or more cartridge cases 30 e.g., firearm cartridge cases. For exemplary purposes, FIG. 12 provides a flow chart 100 illustrating a method for manufacturing a plurality of cartridge cases 30. The method comprises fabricating a plurality of substantially identically sized and shaped unmarked multicaliber inventory cases 30' (e.g., tens of thousands, hundreds of thousands, or millions of unmarked multicaliber inventory cases 30') suitable for use in manufacturing a plurality of different caliber cartridges, as indicated at 102. That is, a plurality of unmarked multicaliber inventory cases 30' are fabricated such that they can be interchangeably used to manufacture a plurality of different caliber cartridges that use cases having substantially the same shape and diameter.

For example, the 223 case family includes cartridges that are generally loaded with, but not limited to, projectiles having a diameter of 0.172, 0.224, 0.243, 0.257, 0.264, 0.277, 0.284, 0.308, 0.323, and 0.338 all of which utilize cases having substantially the same shape and diameter—only the length may differ—such that the 223 cases, e.g., the multicaliber inventory cases 30', can be interchangeably used to accommodate at least any of the above listed projectiles. Generally, the limiting factor in a case projectile capacity is the diameter of the body at the neck of the proposed cartridge case, minus the minimum thickness of the neck as proposed by the designer, generally approximately 20 thousandths of an inch, plus or minus a few thousandths for smaller diameter projectiles up to 30 thousandths of an inch or more for larger diameter projectiles in small arms cartridge cases. Other similar examples can be found in the 308 case family of cartridges, and 30-06 case family of cartridges, both of similar head and body dimensions, but with different overall lengths, among others where cartridges have been designed that can be generally loaded with, but not limited to, projectiles of having a diameter of 0.172, 0.224, 0.243, 0.257, 0.264, 0.277, 0.284, 0.308, 0.323, 0.338, 0.348, 0.358, 0.375, 0.408, 0.416, 0.429, 0.458 all of which utilize cases having substantially the same shape and diameter, only the length may differ, whereby such multicaliber inventory cases 30' can be interchangeably used to accommodate at least any of the above listed projectiles. Again, the limiting factor is the diameter of the body at the neck of the proposed cartridge case, minus the minimum thickness of the neck as proposed by the designer. This principle would apply to any cartridge case family of any head and body size.

In various instances, the unmarked multicaliber inventory cases 30' can be fabricated by working, e.g., machine pressing, stamping, and drawing, a plurality of metal coins, e.g., copper-zinc blended coins, to form the plurality of unmarked multicaliber inventory cases 30' having substantially the identical size and shape. Importantly, each of the plurality of unmarked multicaliber inventory cases 30' comprises the head 14' with no intentional markings or indicia thereon, and the body 18' with no intentional markings or indicia thereon. In various instances, each of the plurality of unmarked multicaliber inventory cases 10' can include the neck 22' with no intentional markings are indicia thereon, while in other instances, the plurality of unmarked multicaliber inventory cases 10' do not include the neck 22'.

The unmarked heads 14' of the unmarked multicaliber inventory cases 30' are sized and shaped to be suitable for use in manufacturing the plurality of different caliber cartridges that can interchangeably utilize substantially the same case (only the length may differ). Particularly, in various embodiments, the heads 14' have an inventory diameter H that is equal to or greater than the longest/largest head diameter needed for manufacturing the one of the plurality of different caliber cartridges having that same head diameter. For example, if the unmarked multicaliber inventory cases 30' are suitable for use in manufacturing 223 case family cartridges, which includes cartridges that are generally loaded with, but not limited to, projectiles having a diameter of 0.172, 0.224, 0.243, 0.257, 0.264, 0.277, 0.284, 0.308, 0.323, and 0.338, the inventory head diameter H would be at least as long/large as, or longer/larger than, the diameter of the case 30' for whichever of the cases with projectiles having a diameter of 0.172, 0.224, 0.243, 0.257, 0.264, 0.277, 0.284, 0.308, 0.323 and 0.338 that requires the largest/longest head diameter. Or, for example, if the unmarked multicaliber inventory cases 30' are suitable for use in manufacturing 308 case family cartridges, or the 30.06 case family cartridges, the inventory head diameter H would be at least as long/large as (or longer/larger than) the diameter of the case 10' for whichever of the 308 case family cartridges or the 30-06 caliber cartridge requires the longest/largest head diameter.

In various embodiments, the bodies 18' of the unmarked multicaliber inventory cases 30' have a diameter D suitable for use in manufacturing the plurality of different caliber cartridges that can interchangeably utilize substantially the same case (only the length may differ). Additionally, the bodies 18' have an inventory length L that is equal to or greater than the longest length needed for manufacturing the one of the plurality of different caliber cartridges having the longest case length. For example, if the unmarked multicaliber inventory cases 30' are suitable for use in manufacturing 223 case family cartridges 223, the case family includes cartridges that are generally loaded with, but not limited to, projectiles of having a diameter of 0.172, 0.224, 0.243, 0.257, 0.264, 0.277, 0.284, 0.308, 0.323, and 0.338, the inventory length L would be at least as long as (or longer than) the length of the case 10' for whichever of the cases with projectiles of having a diameter of 0.172, 0.224, 0.243, 0.257, 0.264, 0.277, 0.284, 0.308, 0.323 and 0.338 that requires the longest case. Or, for example, if the unmarked multicaliber inventory cases 30' are suitable for use in manufacturing 308 case family cartridges, or the 30-06 case family cartridges, the inventory length L would be at least as long as (or longer than) the length of the case 30' for whichever of the 308 case family cartridges, or the 30-06 case family cartridges, requires the longest case.

Once the plurality of unmarked multicaliber inventory cases 30', e.g., tens of thousands, hundreds of thousands, or millions of unmarked multicaliber inventory cases 30', have been fabricated, they can be stored as unmarked multicaliber inventory.

Once the plurality of unmarked multicaliber inventory cases 30' are fabricated, and in various instances stored as inventory, the method for manufacturing one or more cartridge cases 30 continues and includes selecting a number of the plurality of the unmarked inventory cases 30' to be used to manufacturing a selected one of the plurality different caliber cartridges, as indicated at 104. For example, plurality of unmarked multicaliber inventory cases 30' can be stored in inventory until it is desired to utilize a portion (or all) of the stored unmarked multicaliber inventory cases 30' for manufacturing one of the plurality of cartridges for which the respective unmarked multicaliber inventory cases 30' can be utilized. For example, if 50,000 unmarked multicaliber inventory cases 30' suitable to be interchangeably used to manufacture 223 case family cartridges are fabricated, as described herein, and stored as inventory, and one or more company, individual or other manufacturer places an order for 25,000 of a specific cartridge in the 223 case family with 0.257 diameter projectiles and 10,000 of another different specific cartridge in the 223 case family with 0.227 diameter projectiles, 25,000 of the 50,000 stored multicaliber inventory cases 30' will be taken out of inventory for inscribing and finishing (as described further below) to be suitable for use in manufacturing the respective specific cartridge with the 0.257 diameter projectile, and 10,000 of the same 50,000 stored unmarked multicaliber inventory cases 30' will be taken out of inventory for inscribing and finishing (as described further below) to be suitable for use in manufacturing the respective specific cartridge with the 0.277 diameter projectile.

After the plurality of unmarked inventory cases 30' are selected for use in manufacturing a selected one of the plurality different caliber cartridges the method for manufacturing one or more cartridge cases 30 further comprises inscribing, via a laser marking device, the selected number of unmarked inventory cases 30' with at least one inscription 26 to identify at least the name, caliber, or date of manufacture of the respective one of the plurality of different caliber cartridges the selected number of unmarked inventory cases are to be used to manufacture, as indicated at 106. As described above, the laser inscriptions 26 can comprise any desired information or indicia. For example, in various embodiments, the laser inscriptions 26 can comprise the caliber of the cartridge the cases 30' are intended to be used to manufacture, e.g., the caliber of the cartridge for which the cases 30' are intended to be a component thereof, or any other desired information or indicia such as: the name of the case manufacturer, the name of the company, person or other manufactures that the case 30 will be used to manufacture a cartridge for; a trademark; date of manufacture; a serial number; a tracking code; a bar code; a OR code; any desired design, image or picture; any desired text such as a slogan, verse or saying; and/or any other desired data. The laser inscriptions 26 can be inscribed on any portion or part of the unmarked multicaliber inventory cases 30'. For example, the name, caliber, and case manufacture can be laser inscribed on the bottom 14A' of the head 14'. Alternatively, or additionally, the caliber and gun manufacturer can be laser inscribed on the body 18' and on the neck 22'. Furthermore, for example, any other indicia laser inscribed on the head bottom 14A' and/or on the body 18' and on the neck 22' of the unmarked multicaliber inventory cases 30'. The information, data and/or any other indicia 26 can be inscribed on the unmarked multicaliber inventory cases 30' using any suitable laser etching, cutting, or burning device, or other laser inscription or engraving device, machine, or printer (e.g., a UV laser, CO2 laser, Hybrid laser with 1, 2 or 3 axis arraignment).

As described above, after a desired number of the fabricated unmarked multicaliber inventory cases 30' are selected to be used for manufacturing one of the respective different caliber cartridges the cases 30' can be interchangeably used to manufacture, in various embodiments, the selected number of cases 30' will need to be finished (e.g., head trimmed and/or length trimmed and/or necked) such that the cases 30' have the proper geometry, dimensions, size and shape for use in manufacturing respective caliber cartridges. In such embodiments, the method for manufacturing one or more cartridge cases 30 further comprises finishing the cases 30' by performing or completing one or more of:

1) turning or trimming the heads 14' to reduce the inventory diameter H such that the heads 14' have the correct rim diameter for use in manufacturing respective caliber cartridges;
2) trimming the length of the bodies 18' to reduce the inventory L such that the bodies 18' have the corrected body length for use in manufacturing respective caliber cartridges; and
3) necking the bodies 18' to provide the cases 30' with correct neck profile, size, shape, and geometry for use in manufacturing respective caliber cartridges.

It is envisioned that, in various embodiments, the step of inscribing, via a laser marking device, the selected number of unmarked inventory cases 30' with at least one inscription 26 to identify at least the name, caliber, or date of manufacture of the respective one of the plurality of different caliber cartridges the selected number of unmarked inventory cases are to be used to manufacture can be performed and completed prior to, or subsequent to, finishing, (e.g., head trimming, length trimming and necking, the selected number of unmarked inventory cases 30'. It is further envisioned that, in various embodiments, the unmarked multicaliber inventory cases 30' can be inscribed with the caliber or other desired information or indicia prior to, or subsequent to, selecting a number of the plurality of the unmarked inventory cases 30' to be used to manufacturing the selected one of the plurality different caliber cartridges.

Figure 13:
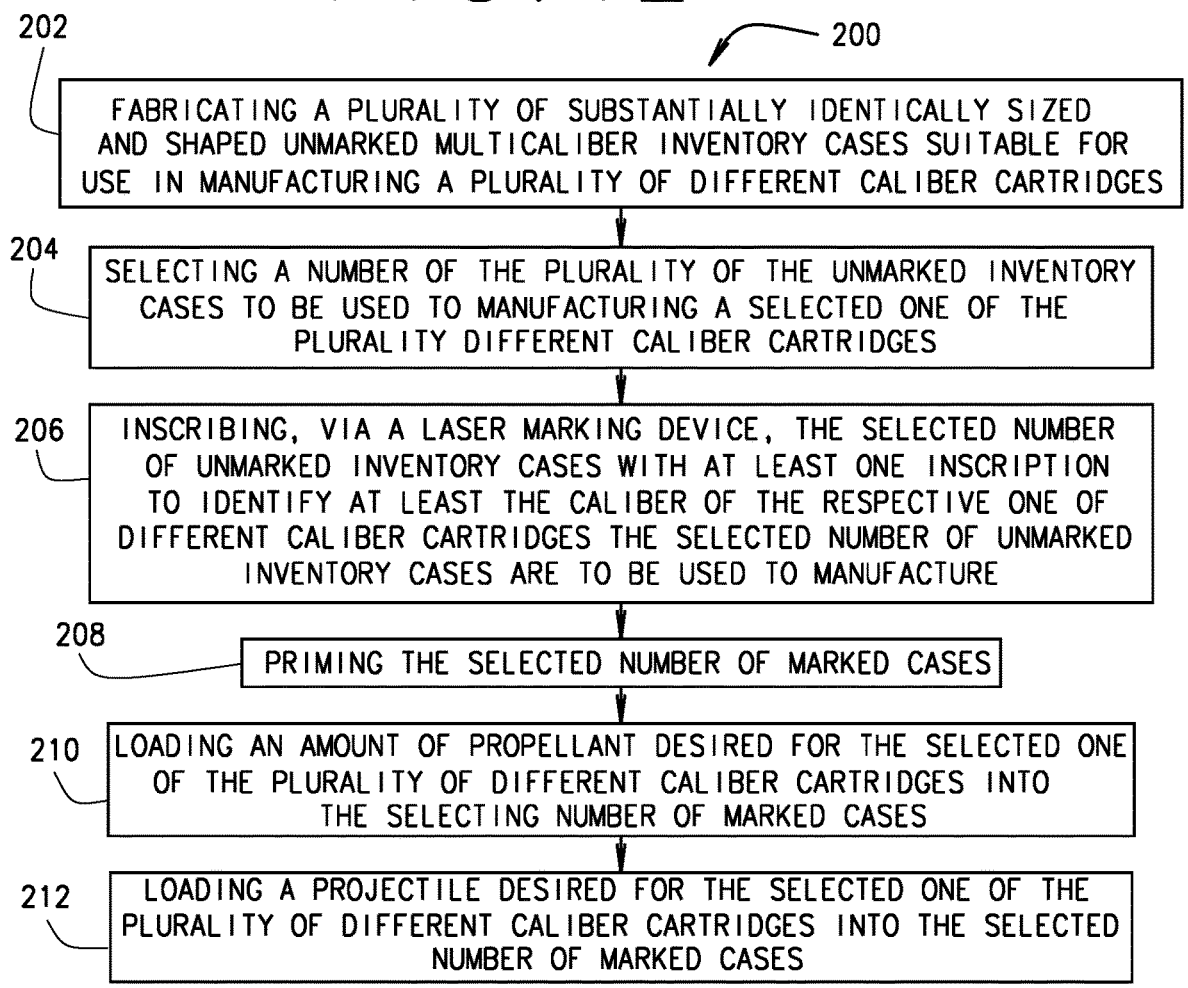
FIG. 13 is a flow chart illustrating a method of manufacturing a cartridge e.g., a firearm cartridge, in accordance with various embodiments of the invention.

Referring now to FIGS. 9A, 9B, 10A, 10B, 11A, 11B and 13, in various embodiments the present disclosure provides a method for manufacturing one or more loaded cartridge 31. For exemplary purposes, FIG. 13 provides a flow chart 200 illustrating a method for manufacturing the loaded cartridge 31. As indicated at 202, the method comprises fabricating a plurality of substantially identically sized and shaped unmarked multicaliber inventory cases 30' as described above with regard to at least 102 of flow chart 100. Once the plurality of unmarked multicaliber inventory cases 30' are fabricated (and in various instances stored as inventory), as indicated at 204, the method for manufacturing the loaded cartridge 31 further comprises selecting a number of the plurality of the unmarked inventory cases 30' to be used to manufacturing a selected one of the plurality different caliber cartridges, as described above with regard to at least 104 of flow chart 100. After the plurality of unmarked inventory cases 30' are selected for use in manufacturing a selected one of the plurality different caliber cartridges, as indicated at 206, the method for manufacturing the loaded cartridge 31 further comprises inscribing, via a laser marking device, the selected number of unmarked inventory cases 30' with at least one inscription 26 to identify at least the name, caliber, or date of manufacture of the respective one of the plurality of different caliber cartridges the selected number of unmarked inventory cases are to be used to manufacture, as described above with regard to at least 106 of flow chart 100.

As described above with regard to flow chart 100, after a desired number of the fabricated unmarked multicaliber inventory cases 30' are selected to be used for manufacturing one of the respective different caliber cartridges the cases 30' can be interchangeably used to manufacture, in various embodiments, the selected number of cases 30' will need to be finished, e.g., head trimmed, length trimmed and necked, such that the cases 30' have the proper geometry, dimensions, size and shape for use in manufacturing respective caliber cartridges. In such embodiments, the method for manufacturing one or more cartridge cases 30 further comprises finishing the cases 30' by performing or completing one or more of:

1) turning or trimming the heads 14' to reduce the inventory diameter H such that the heads 14' have the correct rim diameter for use in manufacturing respective caliber cartridges;
2) trimming the length of the bodies 18' to reduce the inventory L such that the bodies 18' have the corrected body length for use in manufacturing respective caliber cartridges; and
3) necking the bodies 18' to provide the cases 10' with correct neck profile, size, shape, and geometry for use in manufacturing respective caliber cartridges.

In the various embodiments, the step of inscribing, via a laser marking device, the selected number of unmarked inventory cases 30' with at least one inscription 26 to identify at least the name, caliber, or date of manufacture of the respective one of the plurality of different caliber cartridges the selected number of unmarked inventory cases are to be used to manufacture can be performed and completed prior to, or subsequent to, finishing, e.g., head trimming, length trimming and necking, the selected number of unmarked inventory cases 30'. It is further envisioned that, in various embodiments, the unmarked multicaliber inventory cases 30' can be inscribed with the caliber or other desired information or indicia prior to, or subsequent to, selecting a number of the plurality of the unmarked inventory cases 30' to be used to manufacturing the selected one of the plurality different caliber cartridges.

Additionally, is indicated at 208, the method for manufacturing the cartridge 31 further comprises priming the selected number of marked cases 30 by inserting a primer into the bases 14, or otherwise priming the case 30 through injection of priming compound into the case, e.g., as is done with rimfire cases. Furthermore, as indicated at 210 and 212, the method for manufacturing the cartridge 31 continues and includes loading an amount of propellant, e.g., gun powder, desired for the respective caliber cartridge 31 into the selected number of marked cases 30 and loading, or pressing, the projectiles 34 desired for the respective caliber cartridge into the selected number of marked cases 30. Although it has been described above that the selected number of unmarked inventory cases 30' are laser inscribed prior to priming and loading the propellant and projectile 34, it is envisioned that, in various embodiments, the cartridge 31 can be laser inscribed after the cases 30' have been primed and/or loaded with the propellant and projectile 34. Testing has shown that the laser inscribing of the cases 30' subsequent to priming and loading the propellant and projectile 34 does not generate heat sufficient to ignite the compound in the primer, nor the loaded propellant in the case.

In various embodiments, the method for manufacturing the cartridge 31 can further comprise laser inscribing the projectile 34 with indicia 26, prior to or subsequent to loading, or pressing, the projectile 34 into the cases 30/30'

Although it has been described above that the unmarked inventory cases 10' and/or projectiles 34 are generally laser inscribed during a single step of the methods described above, it is envisioned that in various embodiments, the unmarked inventory cases 30' and/or the projectiles 34 can be laser inscribed, as described above, at more than one point or step of the methods described above and remain within the scope of the present disclosure. For example, the unmarked inventory cases 30' can be laser inscribed with certain indicia 26, e.g., a particular caliber, after the cases 30' have been fabricated and prior to be stored as inventory, then they can be laser inscribed with other indicia 26, e.g., a company name, after a number or group of the cases 30' have been selected for use in fabricating the cartridges 31 and before finishing the cases 30', and after finishing the cases 30', and in various instances laser inscribed with yet other indicia 26 (e.g. a QR code) after the cases 30 have been primed and/or loaded with propellant and the projectile 34.

The present disclosure illustrates that it is possible to use a laser to make the appropriate, required, durable markings on the head of a cartridge case using a laser, instead of known mechanical means. Further illustrated in the present disclosure, it that it is possible to put durable markings along the body of the cartridge case and on the projectiles, such as bullets. The marking methods described herein are not obvious as cartridge cases are primarily made of brass that must be worked under pressure to generate the proper grain structure and hardness in the cartridge case. The grain structure and hardness in a cartridge case varies going from the hardest and smallest grain structures in the head to the softer and larger grain structures in the body. Hence, generally heat of any kind can cause the case to weaken drastically by causing the grains to reconsolidate and the brass to soften. This is likely the reason that nothing like method disclosed herein has ever been contemplated previously as the use of a heat source on brass that has reached its final hardness is counter intuitive. However, the laser application process described herein can be done quickly enough as to prevent any meaningful conduction of the heat and most all the heat is expelled by the particles burned from the surface as they are vaporized by the laser. The same is true for markings made on the body and on projectiles. Testing demonstrated nominal temperature increases in the remaining brass of the cartridge case, yet the mark was found to be durable, in accordance with the standard set by SAAMI, such that the markings did not come off when the cases were exposed to mild abrasion or retained in storage, nor after the cartridge had been loaded and discharged. In fact, test results show such a nominal temperature impact from the laser marking process that it is possible to mark loaded cases without causing detonating of the propellant or priming compounds. While it is unlikely that marking of the head would be left until after loading, it is conceivable that the new ability to mark the body could be done after loading.

The marking methods described herein will allow for significant, revolutionary, and unprecedented changes to current manufacturing methods. Companies can now react more swiftly by manufacturing basic unmarked cases in the different case families and warehousing the unmarked cases instead of holding cups on the other side of the most manufacturing intensive deep draw processes that occur prior to heading. This will also speed up the heading process as the lengthy process to change heading dies to adjust the information imprinted on the head will no longer be needed, plus the parts of the heading dies most prone to wear down or crack, e.g., the lettering on the heading dies, can be removed. This will provide more output from the heading machines. The laser marking methods disclosed herein can be done at any point in the manufacturing process up to, and after, loading. One skilled in the art would readily recognize that any physical marking of the case after the heading process would be new. For example, as exemplarily described above, laser marking any part of the case after the heading process shows novelty.

Additionally, one skilled in the art would readily recognize that marking the body has never been done before due to the thinness of the brass sidewalls of the case body. The known mechanical marking processes have never been adapted, and are not suitable to be adapted, to marking such thin and soft brass as the sidewall of a cartridge case. However, the methods described herein open up the potential to mark the sidewall of the case for such things as easier reading of the cartridge designation, tracking loading dates, identifying manufacturing points of origin, serializing the cases, commemorative markings, advertisement markings, safety warnings, labeling proof ammunition, providing load information, and providing any other desired information.

As mentioned earlier, projectiles, such as bullets, have never been marked with by a laser as described herein. Rather, projectiles have usually been coded with paints or dies to indicate some type of a projectile, usually for military designation and use, or to designate the projectiles for proof testing. Such coding methods require knowledge of the particular coding system and the original purchaser to make sure the color code being used to decode the markings is the correct one. Utilizing the marking methods described herein, it is now possible to label projectiles with clear markings to avoid confusion and prevent potentially dangerous situations, or worse. Such methods will further prevent the accidental or undetected release of military grade ammunition into commercial sale.

Furthermore, the increased ability to mark cases on the head and the side with a laser brings new opportunities, such as the ability to add OR codes and bar codes to cases, thereby providing encoded information on individual cartridge cases that has never been achieved before. The value of this embodiment of the invention has two parts. First, civilian markets can now find data on their cartridge cases that allow for all the opportunities that tracking marking methods via smart phones, etc., can provide and permits certain regulatory tracking that was previously impossible. Second, for military markets, this allows for a new level of tracking as far as date and point of manufacture that has never been possible. Tracking can be absolute. Still further, for forensic purposes, both civilian and military, the source and use of the ammunition can now be tracked. Civilian law enforcement can potentially gain new insights into the sources from which criminal elements are obtaining their ammunition, and militaries can track the usage of their own ammunition, even if stolen and used by the opposition.

Figure 14:
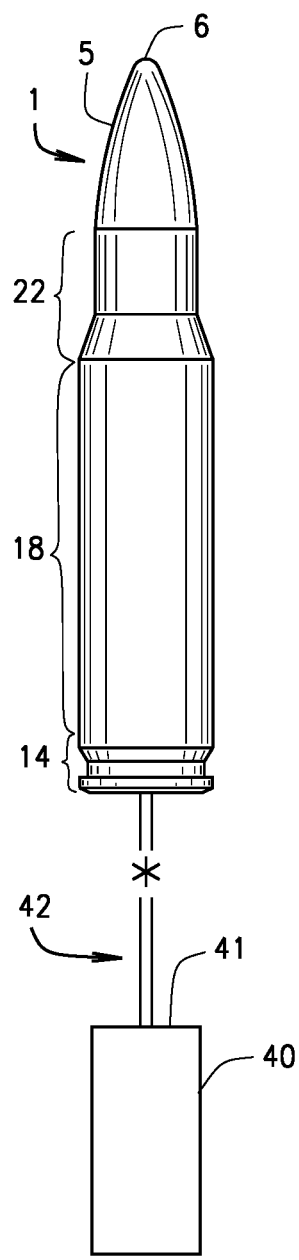
FIG. 14 is a side view showing the method of the present invention in use upon a cartridge.

And turning to the preferred embodiment of the headstamp marking method, FIG. 14 shows a side of the invention in use. Here, a cartridge with its projectile as a 1 with its nose 5 leading to its tip 6, has the projectile inserted into a case at the neck 22 outwardly from the body 18, that appears shown above the head 14. As described above, the head often bears indicia as the head often remains after firing of the cartridge ejects the case. The present invention then marks the head 14 using a beam of laser light as at 42, aimed and controlled by optics as at 41 from a laser generator as at 40. The laser beam 42 inscribes the information within precise portions of the head to avoid ignition and detonation of the cartridge.

Figure 15:
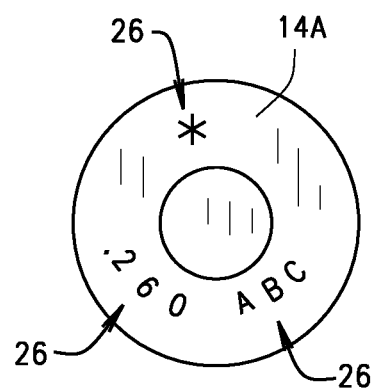
FIG. 15 is a rear view of a head of an inventory case denoting the region of the primer.

FIG. 15 then provides an end view of the head 14 showing its round shape and its face as at 14*a*. Upon the face, the head has information 26 marked thereon about the region of the primer as at 12. The region of the primer has heightened sensitivity to percussive and thermal loads as operation of the cartridge calls for it to detonate precisely.

Figure 16:
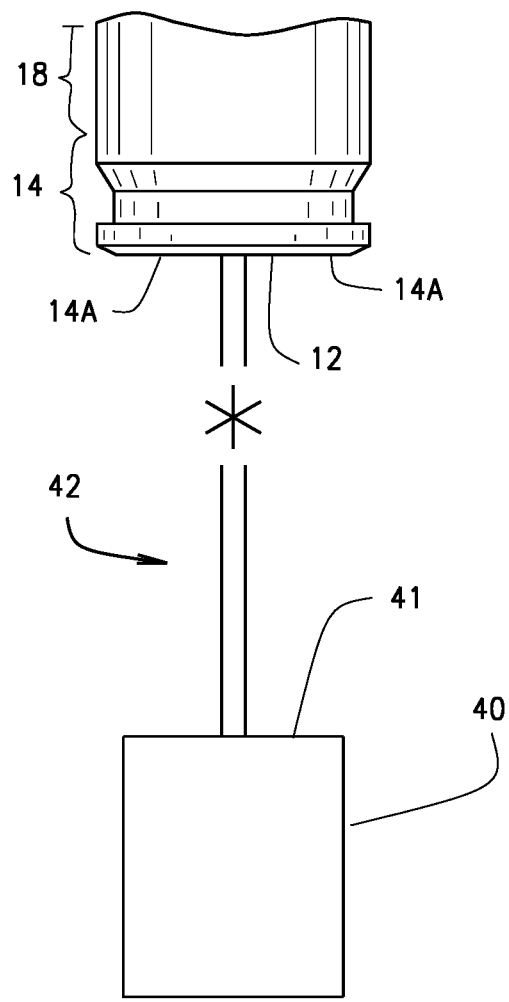
FIG. 16 is an enlarged side view showing the method of the present invention in use upon a head of a cartridge.

Then FIG. 16 has an enlarged side view of the preferred embodiment of the invention in usage upon the face as at 14*a* of a head 14. Though a single case is shown, this invention may inscribe multiple cases held as a gang. Turning to this figure, the generator 40 emits the laser beam 42 at a narrow angle controlled by the optics 41 generally within the machine near the exit aperture for the laser beam. The optics guide the beam 42 around and upon the face 14*a* but outwardly from the primer region 12. The laser beam attains a narrow angle outwardly from a centerline from the laser generator concentric with a centerline of a cartridge 31. Though FIGS. 14, 16 show a cartridge positioned above the laser generator, the cartridge and laser generator may have a joint orientation up to one hundred eighty-three degrees, 183°, in rotation from that shown in these figures.

Figure 17:
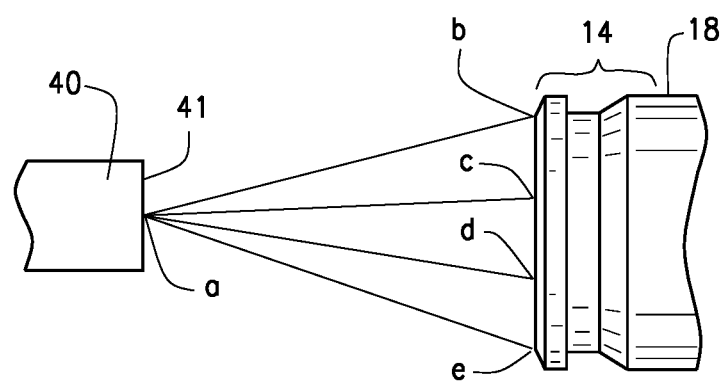
FIG. 17 is a side view showing the permitted areas for the method of the present invention upon a head of an inventory case.

Shown another way, FIG. 17 has the laser generator 40 to the left of the figure, that is ninety degrees, 90°, clockwise from that in FIGS. 14, 16. The generator creates the beam and sends it to the optics 41 for guidance outwardly towards the head 14 at the end of the body 18. The laser beam may inscribe the head but for the primer region as previously described. This figure puts that another way where the beam emits from the optics at point a and may extend to the upper limit of the head as at point b forming line ab. The beam may also emit from the optics at point a and extend to the upper limit of the primer region as at point c forming line ac. The beam may also emit from the optics at point a and extend to the lower limit of the primer region as at point d forming line ad. Here, the primer region appears bound by points c and d. And the beam may emit from the optics at point a once more and appear to decline to the lower limit of the head as at point e forming line ae. The beam may contact the head between points b and c, and points d and e, and thus avoid the primer region. The beam thus may traverse within the triangular regions shown as lines between points a, b, c and points a, d, e. The generator 40 and its optics 41 following the method of the present invention prevent the beam 42 from being incident upon the primer region and that risk for ignition or detonation of a cartridge. The beam, with the present invention, does not contact the primer region 12 between the points c and d and stays out of the triangular region shown as lines between points a, c, d.

Figure 18:
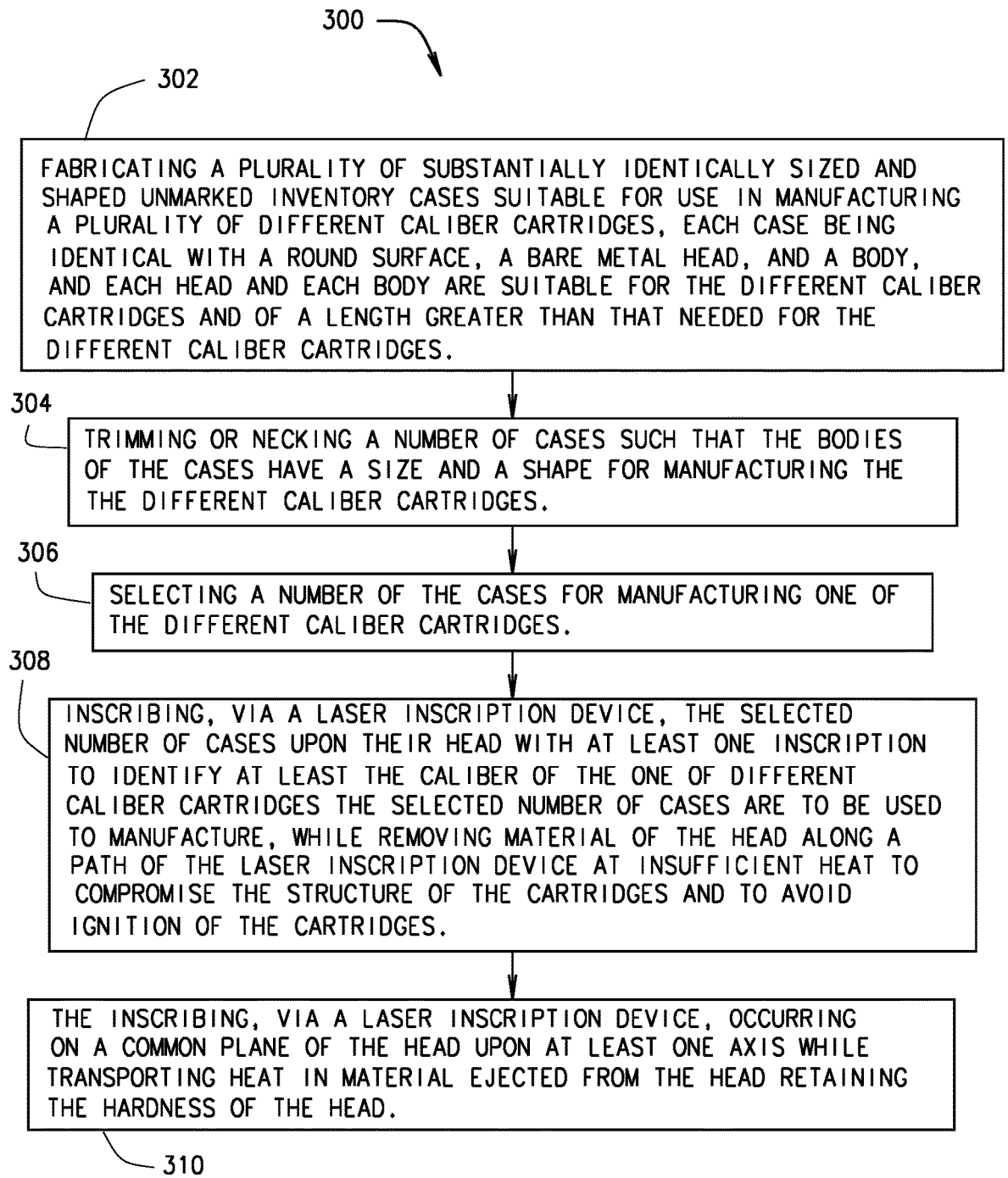
FIG. 18 is a flow chart illustrating the headstamp marking method for manufacturing a cartridge case, in accordance with various embodiments of the present disclosure.

Let us turn to the method of the present invention, the headstamp marking method that appears in FIG. 18. The present invention as at 30 begins it method with fabricating a plurality of substantially identically sized and shaped unmarked inventory cases as at 302 suitable for use in manufacturing a plurality of different caliber cartridges, each case being identical with a round surface, a bare metal head, and a body, and each head and each body are suitable for the different caliber cartridges and of a length greater than that needed for the different caliber cartridges. Then the method as at 304 trims or necks a number of cases such that the bodies of the cases have a size and a shape for manufacturing the different caliber cartridges. The method takes the next step of selecting a number of the cases for manufacturing one of the different caliber cartridges as at 306.

And then, the method inscribes as at 308, via a laser inscription device, the selected number of cases upon their head with at least one inscription to identify at least the caliber of the one of different caliber cartridges the selected number of cases are to be used to manufacture, while removing material of the head along a path of the laser inscription device at insufficient heat to compromise the structure of the cartridges and to avoid ignition of the cartridges. More particularly, then at step denoted as 310 the inscribing, via a laser inscription device, occurs on a common plane of the head upon at least one axis while transporting heat in material ejected from the head and retaining the Vickers/Brinell hardness of the head. Following use of this embodiment of the invention, a cartridge retains 100% of its grain structure thus demonstrating no appreciable annealing has occurred as that the heat from laser inscription did not transfer to the head and remainder of the cartridge. As previously mentioned, this method also applies to multiple cases in a gang or otherwise presented as a group before the laser inscriber. The invention permits usage of the laser where the laser may cover under control of the optics, such as a square target area. This allows marking a succession of cartridges without them or the laser moving and all appearing as if the marking was made directly from above.

Figure 19:
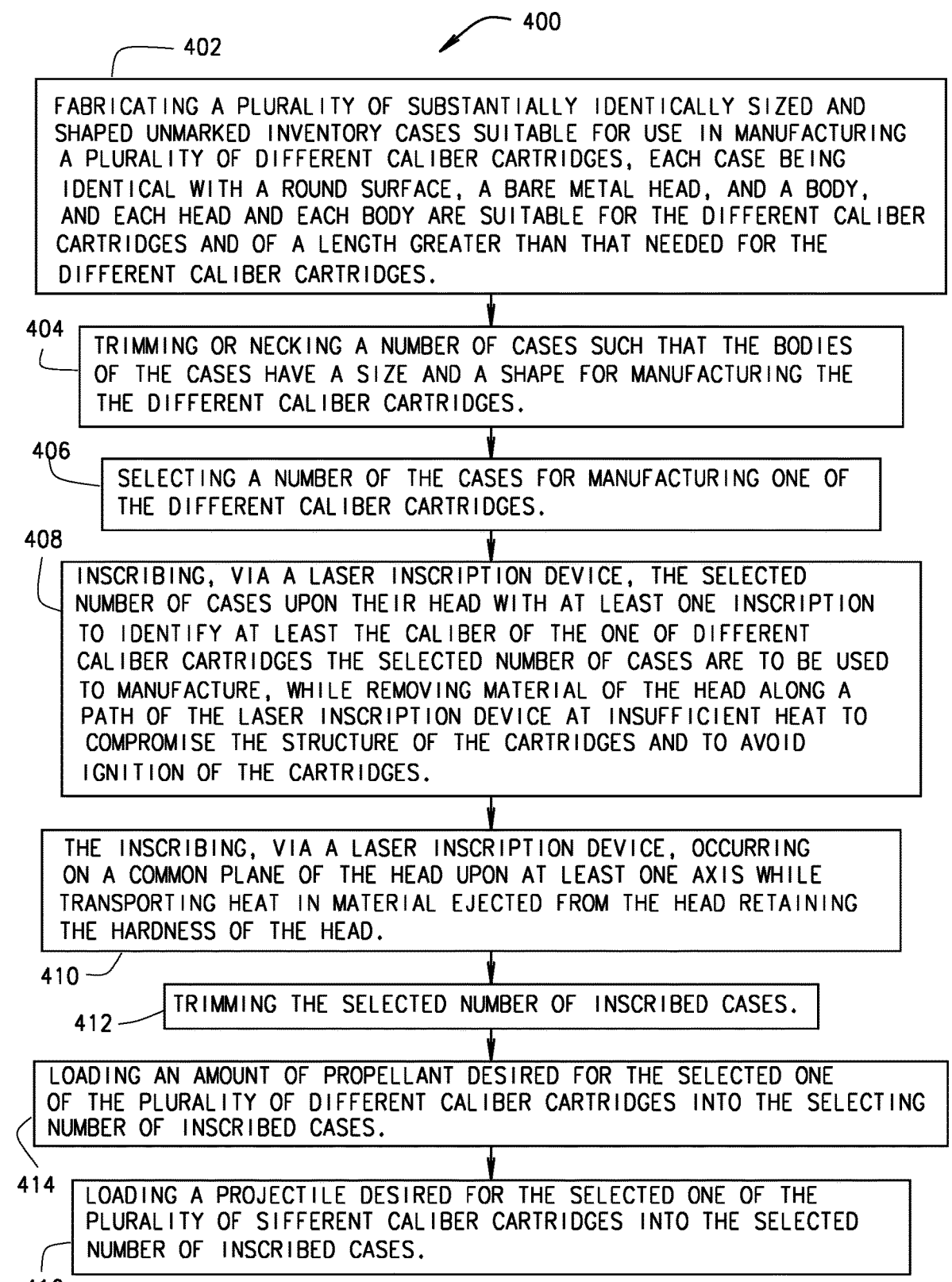
FIG. 19 is a flow chart illustrating the headstamp marking method for manufacturing a cartridge, e.g., a firearm cartridge, in accordance with various embodiments of the present disclosure.

The method of the present invention, the headstamp marking method has an alternate embodiment as at 400 that appears in FIG. 19 about cartridges. This embodiment begins with fabricating a plurality of substantially identically sized and shaped unmarked inventory cases as at 402 suitable for use in manufacturing a plurality of different caliber cartridges, each case being identical with a round surface, a bare metal head, and a body, and each head and each body are suitable for the different caliber cartridges and of a length greater than that needed for the different caliber cartridges. Then this embodiment as at 404 trims or necks a number of cases such that the bodies of the cases have a size and a shape for manufacturing the different caliber cartridges. Next, the embodiment selects a number of the cases for manufacturing one of the different caliber cartridges, as at 406.

And then, the method inscribes as at 408, via a laser inscription device, the selected number of cases upon their head with at least one inscription to identify at least the caliber of the one of different caliber cartridges the selected number of cases are to be used to manufacture, while removing material of the head along a path of the laser inscription device at insufficient heat to compromise the structure of the cartridges and to avoid ignition of the cartridges. In the step denoted as 410 the inscribing, via a laser inscription device, occurs on a common plane of the head upon at least one axis while transporting heat in material ejected from the head retaining the hardness of the head.

With the head so marked by the method to this step, this embodiment of the mention then primes the selected number of inscribed cases as at 412. This embodiment the has the method as at 414 loading an amount of propellant desired for the selected one of the plurality of different caliber cartridges into the selecting number of inscribed cases. The case primed with propellant; the method's embodiment continues as at 416 with loading a projectile desired for the selected one of the plurality of different caliber cartridges into the selected number of inscribed cases.

The headstamp marking method has the steps of:
1) fabricating a plurality of substantially identically sized and shaped unmarked inventory cases, that is uncoated and typically of bare metal, suitable for use in manufacturing a plurality of different caliber cartridges, each of the substantially identically sized and shaped unmarked inventory cases being identical with a round surface, an uncoated metal head, and a body, and each head thereof and each body thereof being suitable for the different caliber cartridges and of a length greater than that needed for the different caliber cartridges;
2) at least trimming or necking a number of the cases such that the bodies of the cases have a size and a shape for manufacturing the different caliber cartridges;
3) selecting a number of the cases for manufacturing one of the different caliber cartridges;
4) inscribing, via a laser inscription device, the cases upon their head with at least one inscription to identify at least the caliber of the one of different caliber cartridges the cases are to be used to manufacture and while removing material of the head along a path of the laser inscription device at insufficient heat to compromise the structure of the cartridges and to ignite the cartridges;
5) the inscribing, via a laser inscription device, step of this method occurring on a common plane of the head of each of the cases upon at least one axis while transporting heat in material ejected from the head and retaining the hardness of the head;
6) priming the selected number of inscribed cases;
7) loading an amount of propellant desired for the one selected caliber of cartridges into the selected inscribed cases; and lastly,
8) loading a projectile desired for the selected one of the plurality of different caliber cartridges into the selected number of inscribed cases.

The method of the invention has its step of inscribing, via a laser inscription device and in that step the laser inscription device remains in a fixed location as the selecting a number of the cases step presents a head before the laser inscription device. During the method's operation, the laser inscription device and a head attain mutual coaxial alignment during the actual inscribing by the laser inscription device. And the inscribing, via a laser inscription device, inscribes an inscription into the head of the highest fidelity and reliability to the information loaded into the inscription device.

The step of inscribing, via a laser inscription device, also may occur on a common plane of the head of each of the cases upon either a horizontal pattern of parallel lines transverse to the longitudinal axis of a case or of a radial pattern of markings arranged at an angle to the longitudinal axis of a case. FIG. 17 illustrates these patterns from the side. These patterns also avoid the small central region of the head, as at 12, and the laser inscription device inscribes the information on the common plane of the head of a case outwardly from the small central region, that is the primer, behind the head. As suggested before, the invention's use of a laser inscription device does so with care and retains hardness of the cases upon the Vickers scale or the Brinell scale. The inventive method via a laser inscription device, retains the grain structure of the cases without annealing happening to them.

The headstamp marking method has its inscribing, via a laser inscription device, that inscribes a head of each of the selected cases with additional indicia that differs from the selected caliber. Such additional indicia include one or more of a name, a trademark, a date of manufacture, a serial number, a tracking code, a bar code, a QR code, an image, and a picture. And the present inventive method also may have a step of turning the heads of the number cases about an axis parallel to their length, such that the heads of those cases are sized and shaped for use in manufacturing the one caliber of cartridge requested.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

While a preferred embodiment of the headstamp marking method has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. The headstamp marking method may use additional subordinate steps suitable to its application in the industry and may interact with machinery and parts of metallic, alloy, polymer, or a composite material as its construction. For example, any suitable sturdy material such as brass for the body, steel for the base, and lead for the boattail may be used instead previously mentioned materials. The projectiles encountered by the headstamp marking method have a construction of a sturdy material that resists corrosion during lengthy storage periods and that survives initial impact on a target to penetrate it. Although providing a headstamp marking method, it should be appreciated that the present invention herein described is also suitable for various projectiles including bullets, artillery rounds, naval ordnance, line launching shots, avalanche mitigation efforts, and the like where headstamp marked projectile has desirable application.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and, components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region, or section, etc., is referred to as being "directly on", "directly engaged to", "directly connected to", or "directly coupled to" another element, object, device, apparatus, component, region, or section, etc., there may be no intervening elements, objects, devices, apparatuses, components, regions, or sections, etc., present. Other words used to describe the relationship between elements, objects, devices, apparatuses, components, regions, or sections, etc., should be interpreted in a like fashion, e.g., "between" versus "directly between", "adjacent" versus "directly adjacent", etc.

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

Although the terms first, second, third, etc., can be used herein to describe various elements, objects, devices, apparatuses, components, regions, or sections, etc., these elements, objects, devices, apparatuses, components, regions, or sections, etc., should not be limited by these terms. These terms may be used only to distinguish one element, object, device, apparatus, component, region, or section, etc., from another element, object, device, apparatus, component, region, or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

As such, those skilled in the art will appreciate that the conception, upon which this disclosure is based, may readily be utilized as a basis for the designing of other structures, methods, and systems for carrying out the several purposes of the present invention. Therefore, the claims include such equivalent constructions insofar as they do not depart from the spirit and the scope of the present invention.

I claim:

1. A headstamp marking method, comprising:

fabricating a plurality of substantially identically sized and shaped unmarked inventory cases suitable for use in manufacturing a plurality of different caliber cartridges, each of said substantially identically sized and shaped unmarked inventory cases being identical with a round surface, a bare metal head, and a body, and each head thereof and each body thereof being suitable for the different caliber cartridges and of a length greater than that needed for the different caliber cartridges;

at least one of trimming or necking a number of said substantially Identically sized and shaped unmarked inventory cases such that the bodies of said cases have a size and a shape for manufacturing the different caliber cartridges;

selecting a number of said substantially identically sized and shaped unmarked inventory cases for manufacturing one of the different caliber cartridges;

inscribing, via a laser inscription device, the selected number of said substantially identically sized and shaped unmarked inventory cases upon their head with at least one inscription to identify at least the caliber of the one of different caliber cartridges the selected number of said cases to be used to manufacture, while removing material of the head along a path of the laser inscription device at insufficient heat to compromise the structure of the cartridges and to avoid ignition of the cartridges;

said inscribing, via a laser inscription device, the selected number of unmarked inventory cases comprises inscribing a head of each of the selected number of unmarked inventory cases with additional indicia that differs from the selected one of the plurality of different caliber cartridges the selected number of unmarked inventory cases are to be used to manufacture, wherein said additional indicia includes one or more of a trademark, a serial number, a tracking code, a bar code, a QR code, an image, and a picture;

said inscribing, via a laser inscription device, wherein said laser inscription device remains in a fixed location as said selecting a number of said substantially Identically sized and shaped unmarked inventory cases moves and then presents a head before said laser inscription device and providing a small central region of said head adapted to receive primer;

wherein said laser inscription device and said head attain mutual coaxial alignment as said small central region of said head centers over said laser inscription device during said inscribing, via a laser inscription device; and said inscribing, via a laser inscription device, occurring on a common plane of the head of each of said cases upon at least one axis while transporting heat in material ejected from the head retaining the hardness of the head.

2. The method of claim 1 further comprising:

said inscribing, via a laser inscription device, occurring on a common plane of the head of each of said cases upon one of a horizontal pattern of parallel lines transverse to the longitudinal axis of a case and of a radial pattern of markings arranged at an angle to the longitudinal axis of a case; and said inscribing, via a laser inscription device, occurring on a common plane of the head of each of said cases outwardly from said small central region of said head.

3. The method of claim 1, wherein said inscribing, via a laser inscription device, retains hardness of the selected number of unmarked inventory cases upon the Vickers scale or the Brinell scale;

said inscribing, via a laser inscription device, retains entirely the grain structure of the selected number of unmarked inventory cases without showing annealing thereto.

4. A headstamp marking method, comprising:

fabricating a plurality of substantially identically sized and shaped unmarked inventory cases suitable for use in manufacturing a plurality of different caliber cartridges, each of said substantially identically sized and shaped unmarked inventory cases being identical with a round surface, an uncoated metal head, and a body, and each head thereof and each body thereof being suitable for the different caliber cartridges and of a length greater than that needed for the different caliber cartridges;

at least one of trimming or necking a number of said substantially Identically sized and shaped unmarked uncoated inventory cases such that the bodies of said cases have a size and a shape for manufacturing the different caliber cartridges:

selecting a number of said substantially identically sized and shaped unmarked uncoated inventory cases for manufacturing one of the different caliber cartridges;

inscribing, via a laser inscription device, the selected number of said substantially identically sized and shaped unmarked uncoated inventory cases upon their head with at least one inscription to identify at least the caliber of the one of different caliber cartridges the selected number of said cases to be used to manufacture, while removing material of the head along a path of the laser Inscription device at insufficient heat to compromise the structure of the cartridges and to ignite the cartridges;

said inscribing, via a laser inscription device, occurring on a common plane of the head of each of said cases upon at least one axis while transporting heat in material ejected from the head retaining the hardness of the head;

priming the selected number of inscribed cases;

loading an amount of propellant desired for the selected one of the plurality of different caliber cartridges into the selecting number of inscribed cases;

loading a projectile desired for the selected one of the plurality of different caliber cartridges into the selected number of inscribed cases;

said inscribing, via a laser inscription device, wherein said laser inscription device remains in a fixed location as said selecting a number of said substantially identically sized and shaped unmarked inventory cases moves and then presents a head before said laser inscription device and providing a small central region of said head adapted to receive primer;

wherein said laser inscription device and said head attain mutual coaxial alignment as said small central region of said head centers over said laser inscription device during said inscribing, via a laser inscription device; and said inscribing, via a laser inscription device, occurring on a common plane of the head of each of said cases upon one of a horizontal pattern of parallel lines transverse to the longitudinal axis of a case and of a radial pattern of markings arranged at an angle to the longitudinal axis of a case.

5. The method of claim 4 further comprising:

providing a small central region of said head; and said inscribing, via a laser inscription device, occurring on a common plane of the head of each of said cases outwardly from said small central region of said head.

6. The method of claim 4, wherein said inscribing, via a laser inscription device, retains hardness of the selected number of unmarked Inventory cases upon the Vickers scale or the Brinell scale; and wherein said inscribing, via a laser inscription device, retains the grain structure of the selected number of unmarked inventory cases without annealing thereto.

7. The method of claim 4, wherein said inscribing, via a laser inscription device, the selected number of unmarked uncoated inventory cases comprises inscribing a head of each of the selected number of unmarked uncoated inventory cases with additional indicia that differs from the selected one of the plurality of different caliber cartridges the selected number of unmarked inventory cases are to be used to manufacture, wherein said additional indicia includes one or more of a trademark, a tracking code, a bar code, a QR code, an image, and a picture.

8. A cartridge case, said cartridge case comprising:

a head, said head having a round shape and a smaller central region generally thereon, said smaller central region is adapted to have primer placed behind it;

a body extending outwardly of said head and is adapted to receive primer therein;

a laser inscription on the head identifying at least a caliber of the cartridge of which the cartridge case is a component thereof upon said head outward from said smaller round region, said laser inscription including additional indicia differing from the caliber laser etching wherein said additional indicia includes one or more of a trademark, a tracking code, a bar code, a QR code, an image, and a picture;

said laser inscription positioned outwardly from said smaller central region of said head;

said laser inscription proceeding along a path removing material of the head at insufficient heat to compromise the structure of the cartridge cases and to avoid ignition of the cartridge case, said laser inscription occurring from a device and said head in mutual coaxial alignment as said small central region of said head centers over said device during said laser inscription; and said laser inscription occurring on a common plane of the head of each of said cartridge cases upon at least one axis, dissipating heat from said head upon ejecting material therefrom and retaining the hardness of the head.

* * * * *